United States Patent
Das et al.

(10) Patent No.: US 12,478,577 B2
(45) Date of Patent: Nov. 25, 2025

(54) PHARMACEUTICAL COMPOSITIONS FOR TREATING OCULAR DISEASES OR DISORDERS

(71) Applicant: Alcon Inc., Fribourg (CH)

(72) Inventors: Sanjib Kumar Das, Morrisville, NC (US); Cheng-Wen Lin, Cary, NC (US)

(73) Assignee: Alcon Inc., Fribourg (CH)

( * ) Notice: Subject to any disclaimer, the term of this patent is extended or adjusted under 35 U.S.C. 154(b) by 70 days.

(21) Appl. No.: 16/810,149

(22) Filed: Mar. 5, 2020

(65) Prior Publication Data

US 2020/0306182 A1     Oct. 1, 2020

Related U.S. Application Data

(60) Provisional application No. 62/814,198, filed on Mar. 5, 2019.

(51) Int. Cl.
| | |
|---|---|
| A61K 9/00 | (2006.01) |
| A61K 31/472 | (2006.01) |
| A61K 31/573 | (2006.01) |
| A61K 47/34 | (2017.01) |
| A61K 45/06 | (2006.01) |

(52) U.S. Cl.
CPC .......... A61K 9/0024 (2013.01); A61K 31/472 (2013.01); A61K 31/573 (2013.01); A61K 47/34 (2013.01); A61K 9/0048 (2013.01); A61K 45/06 (2013.01)

(58) Field of Classification Search
CPC .. A61K 9/0024; A61K 31/472; A61K 31/573; A61K 47/34; A61K 9/0048; A61K 45/06; A61K 9/0051; A61K 9/0019; A61K 31/519; A61K 31/52; A61K 31/551; A61K 31/5575; A61K 2300/00; A61P 27/02

See application file for complete search history.

(56) References Cited

U.S. PATENT DOCUMENTS

| | | | |
|---|---|---|---|
| 9,610,246 B2 * | 4/2017 | Shiah | A61K 47/32 |
| 9,789,189 B2 | 10/2017 | Thies et al. | |
| 9,798,189 B2 * | 10/2017 | Murata | G02F 1/133528 |
| 2007/0292476 A1 | 12/2007 | Landis et al. | |
| 2010/0124565 A1 | 5/2010 | Spada et al. | |
| 2013/0330383 A1 * | 12/2013 | Wirostko | A61K 9/0048 424/400 |
| 2014/0105957 A1 | 4/2014 | Franken et al. | |
| 2014/0179802 A1 * | 6/2014 | Franken | A61K 9/0019 528/321 |
| 2015/0037422 A1 * | 2/2015 | Kaplan | A61K 31/56 424/491 |
| 2016/0310417 A1 | 10/2016 | Prausnitz et al. | |
| 2017/0367992 A1 | 12/2017 | Mihov et al. | |
| 2018/0117148 A1 | 5/2018 | Holman | |
| 2018/0296525 A1 | 10/2018 | Roizman et al. | |

FOREIGN PATENT DOCUMENTS

| | | | | |
|---|---|---|---|---|
| JP | 2014-184348 A | 10/2014 | | |
| JP | 2016-502608 A | 1/2016 | | |
| JP | 2016-515618 A | 5/2016 | | |
| JP | 2017-537903 A | 12/2017 | | |
| WO | 2009/130332 A1 | 10/2009 | | |
| WO | 2012/150255 A | 11/2012 | | |
| WO | 2014/053542 A | 4/2014 | | |
| WO | 2014/165308 A2 | 10/2014 | | |
| WO | WO-2015085251 A1 * | 6/2015 | ......... | A61K 31/5575 |
| WO | 2015/126477 A1 | 8/2015 | | |
| WO | 2016/037169 A1 | 3/2016 | | |
| WO | 2016/097297 A1 | 6/2016 | | |
| WO | 2017/015604 A | 1/2017 | | |
| WO | 2017/120600 A1 | 7/2017 | | |
| WO | WO-2018161035 A1 * | 9/2018 | ............. | A61K 31/33 |
| WO | 2020/181060 A1 | 9/2020 | | |

OTHER PUBLICATIONS

International Search Report and Written Opinion, dated May 22, 2020, for International Patent Application No. PCT/US2020/021136.

Extended European Search Report, dated Nov. 14, 2022, for European Application No. 20766052.3.

* cited by examiner

*Primary Examiner* — Sean M Basquill
(74) *Attorney, Agent, or Firm* — K&L Gates LLP; Louis C. Cullman; Benjamin D. Heuberger

(57) ABSTRACT

Provided herein are pharmaceutical compositions, intravitreal implants and particle suspensions comprising a polymer matrix and at least one therapeutic agent that is released in a substantially linear manner for a particular duration.

5 Claims, 5 Drawing Sheets

PHARMACEUTICAL COMPOSITIONS FOR TREATING OCULAR DISEASES OR DISORDERS

RELATED APPLICATIONS

This application claims priority of U.S. Provisional Patent Application Ser. No. 62/814,198, filed Mar. 5, 2019, the entire content of which is incorporated herein by reference.

FIELD OF THE INVENTION

The present invention relates to the field of pharmaceutical compositions, implants formed from pharmaceutical compositions, methods of forming implants, and methods of treating ocular diseases and disorders.

BACKGROUND

Ocular inflammatory diseases or disorders, such as macular edema, retinal vein occlusion, and uveitis, can cause blurry vision, double vision, floaters, ocular pain, loss of vision, and may result in blindness in severe cases.

For treatment, corticosteroids, such as dexamethasone (Ozurdex®) or triamcinolone acetonide (TRIESENCE®), can be injected via intravitreal injection (IVT). Repeated bolus injections of corticosteroids such as TRIESENCE® are associated with cataract formation, increased intraocular pressure, vitreous floaters, endophthalmitis, decreased visual acuity, and retinal injury. Patients may be administered numerous injections over the course of treatment. This regimen is burdensome for patients and medical care providers.

Intravitreal implants have been developed that deliver a sustained concentration of a therapeutic agent over a period of time. These implants are injected or surgically implanted in the vitreous of the eye for the release of the therapeutic agent to the posterior of the eye. For example, OZURDEX® is an intravitreal implant used for the extended release of dexamethasone to treat various ocular diseases or disorders. However, sufficient levels of the therapeutic agent are released for only approximately 30 to 60 days, and then a new implant must be injected into the eye of the patient. Repeated injections may result in pain, headache, conjunctival blood spot, intraocular infection, globe perforation, fibrosis of the extraocular muscles, vitreous detachment, reactions to the delivery vehicle, increased intraocular pressure, and cataract development. Alternatively, an intravitreal implant containing fluocinolone acetonide (ILUVIEN®), has been developed, which releases fluocinolone acetonide over a period of approximately 3 years. This duration of corticosteroid exposure is often too extensive for many patients and may result in increased risk of corticosteroid-associated adverse effects, including cataract formation and increased intraocular pressure.

Various biodegradable polymers have been used to produce such intravitreal implants. Particular examples of such polymers are poly(lactic-co-glycolic acid) (PLGA), and poly(lactic acid) or polylactic acid or polylactide (PLA), as well as various analogs or derivatives. For example, published PCT patent application WO201715604 (incorporated by reference herein) discloses, inter alia, pharmaceutical compositions for treating an ocular disease or disorder comprising a biodegradable polymer matrix and at least one therapeutic agent dispersed within the polymer matrix, wherein the polymer matrix may comprise a biodegradable poly(D,L-lactide) homopolymer, a biodegradable poly(D,L-lactide-co-glycolide), or a mixture thereof. Biodegradable polyester amide (PEA) polymers for use in biodegradable implants have been previously described. PEAs are based upon amino acids and contain several peptide bonds. Synthetic methods for preparing PEAs are described in, for example, U.S. Patent Application Publication No. 2008/0299174, the entire content of which is incorporated herein by reference. A general structure of a polyester amide, and in particular a polyester amide co-polymer, is described in U.S. Pat. No. 9,789,189, the entire contents of which is incorporated herein by reference, is the chemical structure (I) set forth below:

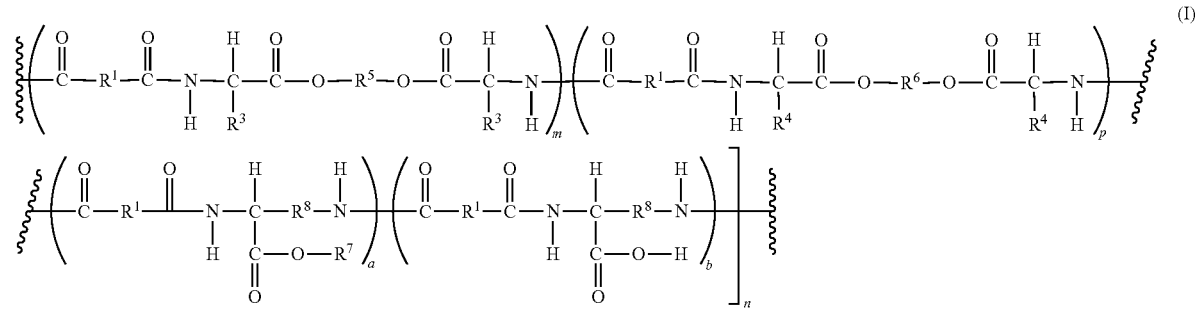

wherein:

m+p varies from 0.9-0.1 and a+b varies from 0.1 to 0.9;

m+p+a+b=1, wherein one of m or p could be 0;

n varies from 5 to 300 and wherein a is at least 0.01, b is at least 0.015 and the ratio of a to b (a:b) is from 0.1:9 to 0.85:0.15, wherein the m unit and/or p unit, and the a and b units, are randomly distributed;

$R^1$ is independently selected from $(C_2\text{-}C_{20})$alkyl;

$R^3$ and $R^4$ in a single backbone unit m or p, respectively, are independently selected from hydrogen, $(C_1\text{-}C_6)$ alkyl, $(C_2\text{-}C_6)$alkenyl, $(C_2\text{-}C_6)$alkynyl, $(C_6\text{-}C_{10})$aryl, $(C_1\text{-}C_6$ alkyl, $-(CH_2)SH$, $-(CH_2)_2S(CH_3)$, $(CH_3)_2-$CH$-CH_2-$, $-CH(CH_3)_2$, $-CH(CH_3)-CH_2-CH_3$, $-CH_2-C_6H_5$, $-(CH_2)_4-NH_2$, and mixtures thereof;

$R^5$ is independently selected from $(C_2\text{-}C_{20})$alkyl, $(C_2\text{-}C_{20})$ alkenylene;

$R^6$ is selected from bicyclic-fragments of 1,4:3,6-dianhydrohexitols of structural formula (II):

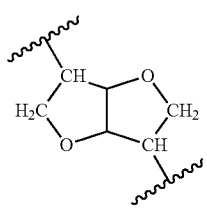 [SMILES: *C1COC2C(*)COC12]

$R^7$ is independently selected from the group consisting of $(C_6-C_{10})$ aryl, $(C_1-C_6)$alkyl or a protecting group; and $R^8$ is $-(CH_2)_4-$.

There is a great need in the medical field for treatment, e.g., a pharmaceutical composition formulated to be a delivery system, for an intravitreal implant with an improved safety and efficacy profile that releases a therapeutic agent directly to the posterior of an eye in a substantially linear manner for a duration of at least 3 months. Such a pharmaceutical composition would likely improve both compliance and the adverse event profile of current intravitreal implants.

The citation of any reference herein should not be deemed as an admission that such reference is available as prior art to the instant invention.

SUMMARY

Broadly, the present invention extends to a pharmaceutical composition for treating an ocular disease or disorder, comprising a biodegradable polymer matrix that comprises a mixture of a first polymer and a second polymer, wherein (1) the first polymer is a biodegradable polyester amide polymer; and (2) the second polymer is selected from (i) a biodegradable poly(D,L-lactide) polymer; (ii) a biodegradable poly (D,L-lactide-co-glycolide) polymer; and (iii) any combination of (i) and (ii). At least one therapeutic agent or an analog or derivative thereof, a pharmaceutically acceptable salt, zwitterion, polymorph or solvate thereof is homogenously dispersed within the polymer matrix. In a particular embodiment, a pharmaceutical composition of the present invention is formulated for intravitreal administration to a subject's eye.

Current treatments for a variety of ocular diseases or disorders such as, for example increased ocular pressure or inflammation, require the patient to place drops in his or her eyes each day or to receive multiple steroidal injections into the eye. A pharmaceutical composition of the present invention is designed for release of a therapeutically effective amount of at least one therapeutic agent in a substantially linear manner, thus eliminating the need for daily drops and multiple steroidal injections.

In a particular embodiment, a pharmaceutical composition of the present invention is formulated to release a therapeutically effective amount of at least one therapeutic agent in a substantially linear manner for approximately one month, two months, three months, four months, five months, six months, seven months, eight months, nine months, ten months, eleven months, twelve months, or longer.

In some embodiments, provided herein are pharmaceutical compositions for treating an ocular disease or disorder, comprising:
(a) a biodegradable polymer matrix comprising a mixture of a first polymer and a second polymer, wherein:
(1) the first polymer is a biodegradable polyester amide polymer (PEA); and
(2) the second polymer is a biodegradable poly(D,L-lactide) polymer (PLA), a biodegradable polyglycolide polymer (PGA), a biodegradable poly (D,L-lactide-co-glycolide) polymer (PLGA), or a combination thereof; and
(b) at least one therapeutic agent or analog, derivative, pharmaceutically acceptable salt, zwitterion, polymorph or solvate thereof, homogenously dispersed within the polymer matrix.

In some embodiments, the pharmaceutical compositions provided herein are formulated for intravitreal administration to a subject's eye, and the pharmaceutical composition is formulated to release the at least one therapeutic agent from the pharmaceutical composition in a substantially linear manner for about 1 month to about 6 months.

Numerous therapeutic agents have applications in a pharmaceutical composition of the present invention including: (a) those that modulate and particularly inhibit the activity of a kinase, such as a Rho kinase, a JAK kinase, a vascular endothelial growth factor receptor (VEGF-R), or a tyrosine kinase; (b) a prostaglandin, (c) a corticosteroid, or (d) any combination of (a)-(c).

In some embodiments, the therapeutic agents may include those that modulate and particularly inhibit the activity of a kinase, such as an IKK kinase.

Particular therapeutic agents, as well as analogs or derivatives thereof, solvates thereof, pharmaceutically acceptable salts thereof, polymorphs thereof and zwitterions thereof include, but certainly are not limited to:
a corticosteroid, e.g., dexamethasone, fluocinolone acetonide, budesonide, beclomethasone, beclomethasone (e.g., as the mono or the dipropionate ester), flunisolide, fluticasone (e.g. as the propionate or furoate ester), ciclesonide, mometasone (e.g. as the furoate ester), mometasone desonide, rofleponide, hydrocortisone, prednisone, prednisolone, methyl prednisolone, naflocort, deflazacort, halopredone acetate, fluocinolone acetonide, fluocinonide, clocortolone, tipredane, prednicarbate, alclometasone dipropionate, halometasone, rimexolone, deprodone propionate, triamcinolone, betamethasone, fludrocortisone, desoxycorticosterone, rofleponide, etiprednol dicloacetate and the like, or any combination thereof;
a prostaglandin, e.g., latanoprost, bimatoprost, travoprost, tafluprost, 3-hydroxy-2,2-bis(hydroxymethyl)propyl 7-((1r,2r,3r,5s)-2-((r)-3-(benzo[b]thiophen-2-yl)-3-hydroxypropyl)-3,5-dihydroxycyclopentyl)heptanoate having the structure:

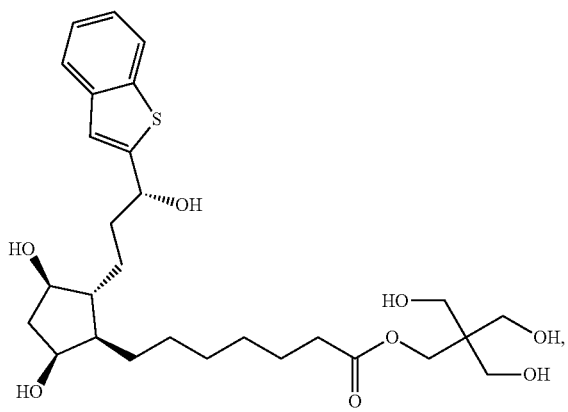 [SMILES: O=C(CCCCCC[C@@H]1[C@@H](CC[C@@H](O)c2cc3ccccc3s2)[C@H](O)C[C@@H]1O)OCC(CO)(CO)CO]

cloprostenol isopropyl ester, 13,14-dihydrocloprostenol isopropyl ester, latanoprostene bunod, unoprostone, PGF$_{1\alpha}$ isopropyl ester, PGF$_{2\alpha}$ isopropyl ester, PGF$_{3\alpha}$ isopropyl ester, fluprostenol, or any combination thereof;

a Rho kinase (ROCK) inhibitor, e.g. netarsudil or ripasudil or a pharmaceutically acceptable salt thereof;

a JAK kinase inhibitor, e.g., Ruxolitinib ("JAKAFI" and "JAKAVI") against JAK1/JAK2, Tofacitinib ("XELJANZ" and "JAKVINUS") against JAK3, Oclacitinib ("APOQUEL") against JAK1, and Baricitinib ("OLUMIANT") against JAK1/JAK2; and a receptor tyrosine kinase inhibitor, e.g., gefitinib, lapatinib, erlotinib, sunitinib, sorafenib, regorafenib, afatinib, vandetanib, semaxanib, cediranib, neratinib, axitinib, lestaurtinib, tivozanib, or any combination thereof.

In some embodiments, the therapeutic agents include dukeprost or tiaprost.

In some embodiments, the ROCK inhibitors of the therapeutic agents include 3-amino-N-(1-oxo-1,2-dihydroisoquinolin-6-yl)-2-(thiophen-3-yl)propanamide, (S)-3-amino-2-(4-(hydroxymethyl)phenyl)-N-(isoquinolin-6-yl) propanamide, (1R,2R)—N-(4-methylisoquinolin-6-yl)-2-(4-(N-(pyridin-2-yl)sulfamoyl)phenyl)cyclopropane-1-carboxamide, or a pharmaceutically acceptable salt thereof.

In some embodiments, the therapeutic agents include cyclopropyl amide JAK inhibitors, including CAS #2246332-69-2 and its (R,R) isomer: 2246332-34-1, CAS #2246331-96-2, CAS #2246331-95-1 CAS #2246331-94-0, CAS #2246331-82-6.

In some embodiments, the therapeutic agents include prodrugs of the therapeutic agents described.

In a pharmaceutical composition of the present invention, a ratio of the amount of polymer 1 to polymer 2, as well as a ratio of the amount of the components used in polymer 2 when polymer 2 is a combination of polymers, are critical to engineering a pharmaceutical composition that has the desired properties with respect to the amount of at least one therapeutic agent delivered in a substantially linear manner, as well as the duration such delivery occurs in a substantially linear manner. In a particular embodiment of a pharmaceutical composition of the present invention, the polymer matrix comprises:

60 weight % biodegradable polyester amide polymer;
20% weight % biodegradable poly(D,L-lactide) polymer; and
20% weight biodegradable poly (D,L-lactide-co-glycolide) polymer.

Moreover, a particular embodiment of a pharmaceutical composition of the present invention comprises:

about 59 weight % a polymer matrix wherein:
about 60 weight % of the polymer matrix is a biodegradable polyester amide polymer;
about 20 weight % of the polymer matrix is a biodegradable poly(D,L-lactide) polymer; and
about 20 weight % of the polymer matrix is a biodegradable poly (D,L-lactide-co-glycolide) polymer; and
about 41 weight % at least one therapeutic agent.

A particular therapeutic agent having applications such a pharmaceutical composition of the present invention is dexamethasone.

A pharmaceutical composition of the present invention can be formulated for intravitreal administration to a subject's eye in which the release of the at least one therapeutic agent occurs in a substantially linear manner such that about 1% of the total of the at least one therapeutic agent is released per day for about 3 months.

Numerous methods are available to one of ordinary skill in the art to form a polymer matrix of a pharmaceutical composition of the invention. A particular method is mechanically blending the first polymer and the second polymer. Other methods are described infra.

Likewise, the amount of the at least one therapeutic agent loaded into a pharmaceutical composition of the present invention can vary, depending upon the desired amount of therapeutic agent to be delivered in a substantially linear manner, as well as the duration in which the delivery occurs in a substantially linear manner. In a particular embodiment, a pharmaceutical composition of the present invention comprises (a) about 51 weight % polymer matrix; and (b) about 49 weight % at least one therapeutic agent.

A biodegradable (D,L-lactide) polymer used in a pharmaceutical composition of the present invention can be an acid end-capped biodegradable poly(D,L-lactide) homopolymer, or an ester end-capped poly(D,L-lactide) homopolymer.

Similarly, a poly(D,L-lactide-co-glycolide) polymer used in a pharmaceutical composition of the present invention can be an ester end-capped biodegradable poly(D,L-lactide-co-glycolide) copolymer, or an acid-capped biodegradable poly (D,L-lactide-co-glycolide).

Numerous types of polyester amide (PEA) polymers have applications in a pharmaceutical composition of the present invention. Generally, such a PEA comprises the chemical structure formula (I):

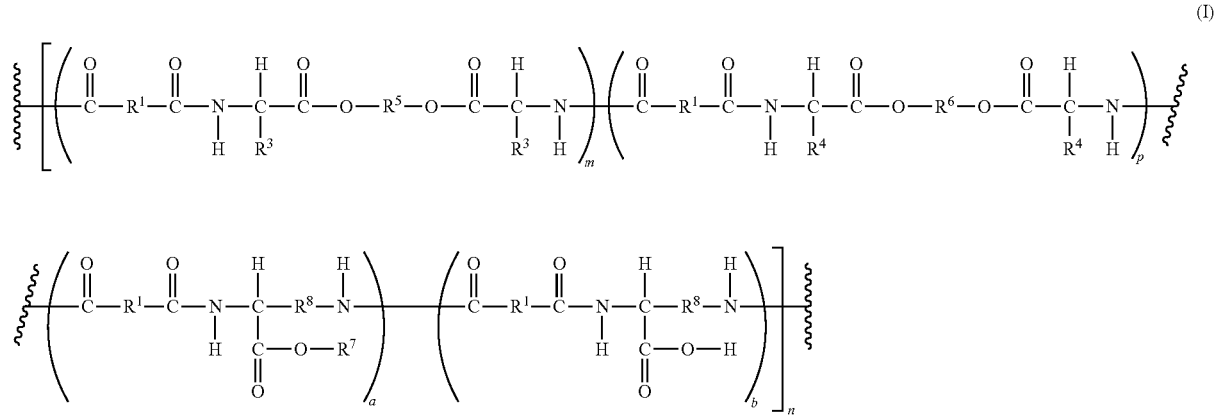

wherein:

m+p varies from 0.9-0.1 and a+b varies from 0.1 to 0.9;

m+p+a+b=1, wherein m or p could be 0;

n varies from 5 to 300 and wherein a is at least 0.01, b is at least 0.015 and the ratio of a to b (a:b) is from 0.1:9 to 0.85:0.15, wherein the m unit and/or p unit, and the a and b units, are randomly distributed;

$R^1$ is independently selected from $(C_2-C_{20})$alkyl;

$R^3$ and $R^4$ in a single backbone unit m or p, respectively, are independently selected from hydrogen, $(C_1-C_6)$ alkyl, $(C_2-C_6)$alkenyl, $(C_2-C_6)$alkynyl, $(C_6-C_{10})$aryl, —$(CH_2)SH$, —$(CH_2)_2S(CH)_3$, $(CH_3)_2$—CH—$CH_2$—, —$CH(CH_3)_2$, —$CH(CH_3)$—$CH_2$—$CH_3$, —$CH_2$—$C_6H_5$, —$(CH_2)_4$—$NH_2$, and mixtures thereof;

$R^5$ is independently selected from $(C_2-C_{20})$alkyl, $(C_2-C_{20})$ alkenylene;

$R^6$ is selected from bicyclic-fragments of 1,4:3,6-dianhydrohexitols of structure formula (II),

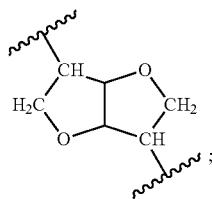 [SMILES: *C1COC2C(*)COC12]

$R^7$ is independently selected from $(C_6-C_{10}$ aryl, $(C_1-C_6)$ alkyl or a protecting group; and $R^8$ is —$(CH_2)_4$—.

A particular PEA having applications in a pharmaceutical composition of the present invention has the chemical structure formula (III):

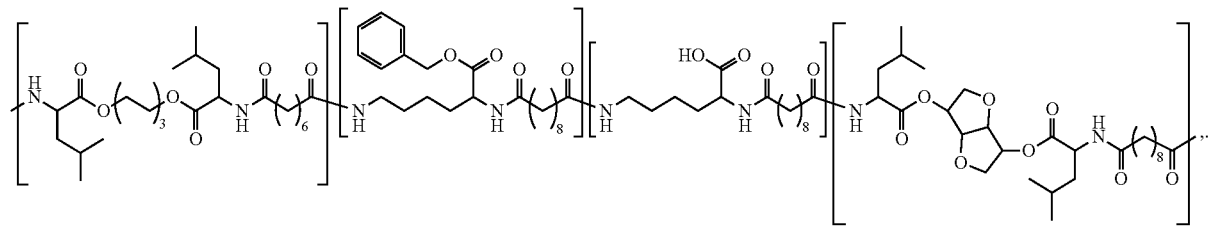

(III)

Other examples of PEA polymers having applications herein are disclosed in U.S. Pat. Nos. 9,873,765 and 9,789,189, the entire contents of which are herein incorporated by reference.

Also provided is an intravitreal implant for treating an ocular disease or disorder that comprises a pharmaceutical composition of the present invention. Numerous methods are available to produce an intravitreal implant of the present invention. A particular method having applications herein is the utilization of PRINT® technology particle fabrication. Use of the PRINT® technology enables the creation of a large number of intravitreal implants that have custom tailored and highly consistent and predictable therapeutic agent release profiles that have highly reproducible characteristics from implant to implant, which was not possible using other types of technology, such as for example extrusion. The PRINT® technology, which is used to produce an intravitreal implant of the present invention, as well as particles used in a particle suspension of the present invention, is described in Published PCT applications WO2007021762, WO2007024323, and WO2007030698, the entire contents of which are herein incorporated by reference. Mold cavities used to fabricate an intravitreal implant of the present invention may vary from the recited dimensions by ±50 µm, or ±40 µm, or ±30 µm, or ±20 µm, or ±10 µm, or ±5 µm, in various aspects.

PRINT® technology enables the creation of intravitreal implants having variations in release profiles of therapeutic agents that are not statistically significant. Consequently, the at least one therapeutic agent release profiles demonstrated by embodiments of the implants exhibit coefficients of variation that are within a confidence interval and does not impact the substantially linear manner in which a therapeutic agent is delivered. The ability to produce intravitreal implants of the present invention that demonstrate such a high degree of consistent therapeutic agent loading or release is an advancement over the state of the art.

In a particular embodiment of the present invention, provided is an intravitreal implant comprising a pharmaceutical composition that comprises:

(a) about 59 weight % a polymer matrix comprising:
(i) about 60 weight % biodegradable polyester amide polymer having a structure of:

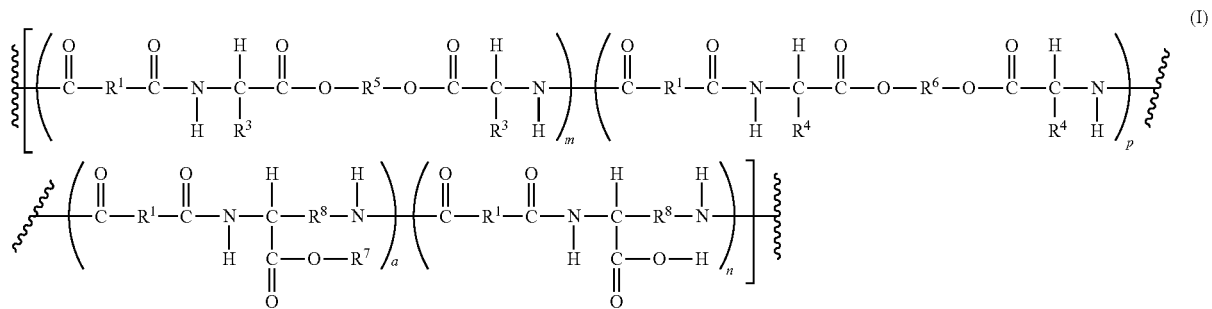

wherein:
m+p varies from 0.9-0.1 and a+b varies from 0.1 to 0.9;
m+p+a+b=1, wherein one of m or p could be 0;
n varies from 5 to 300 and wherein a is at least 0.01, b is at least 0.015 and the ratio of a to b (a:b) is from 0.1:9 to 0.85:0.15, wherein the m unit and/or p unit, and the a and b units, are randomly distributed;
$R^1$ is independently selected from $(C_2-C_{20})$alkyl;
$R^3$ and $R^4$ in a single backbone unit m or p, respectively, are independently selected from hydrogen, $(C_1-C_6)$ alkyl, $(C_2-C_6)$alkenyl, $(C_2-C_6)$alkynyl, $(C_6-C_{10})$aryl, $(C_1-C_6$ alkyl, $-(CH_2)SH$, $-(CH_2)_2S(CH_3)$, $(CH_3)_2-$ $CH-CH_2-$, $-CH(CH_3)_2$, $-CH(CH_3)-CH_2-CH_3$, $-CH_2-C_6H_5$, $-(CH_2)_4-NH_2$, and mixtures thereof;
$R^5$ is independently selected from $(C_2-C_{20})$alkyl, $(C_2-C_{20})$ alkenylene;
$R^6$ is selected from bicyclic-fragments of 1,4:3,6-dianhydrohexitols of structural formula (II):

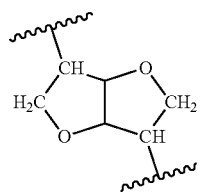 [SMILES: *C1COC2C(*)COC12]

$R^7$ is independently selected from the group consisting of $(C_6-C_{10})$ aryl, $(C_1-C_6)$alkyl or a protecting group; and
$R^8$ is $-(CH_2)_4-$;
(ii) about 20% weight % biodegradable poly(D,L-lactide) homopolymer; and
(iii) about 20% weight biodegradable poly (D,L-lactide-co-glycolide) copolymer; wherein (i), (ii) and (iii) are blended together to form the polymer matrix, and (b) about 41 weight % dexamethasone that is homogenously dispersed within the polymer matrix;

wherein:
the pharmaceutical composition is formulated for intravitreal administration to a subject's eye; and dexamethasone is released from the pharmaceutical composition in a substantially linear manner such that about 1% of the total dexamethasone contained in the pharmaceutical composition is released per day for about 3 months.

Also provided is a method for treating an ocular disease or disorder in a human in need thereof comprising administrating at least one intravitreal implant of the present invention to the vitreous humor of an eye of the human An ocular disease or disorder that can be treated with an intravitreal implant of the present invention includes, but is not limited to ocular hypertension, an ocular inflammatory disease or disorder, glaucoma, a neurodegenerative disease or disorder, or any combination thereof.

Examples of an ocular inflammatory disease or disorder that can be treated with a pharmaceutical composition of the present invention, as well as an intravitreal implant of the present invention include, but are not limited to, uveitis, a corneal ulcer, endophthalmitis, an autoimmune disease of the cornea or ocular surface, an ophthalmic manifestation of HIV disease or a combination thereof. In some embodiments, the ocular inflammatory disease or disorder is ocular herpes. Non-limiting examples of particular neurodegenerative diseases or disorders that can be treated with the present invention are diabetic eye disease, macular degeneration (wet or dry), inflammation, or dry eye.

These and other aspects of the present invention will be better appreciated by reference to the following drawings and Detailed Description.

DETAILED DESCRIPTION

Figure 1:
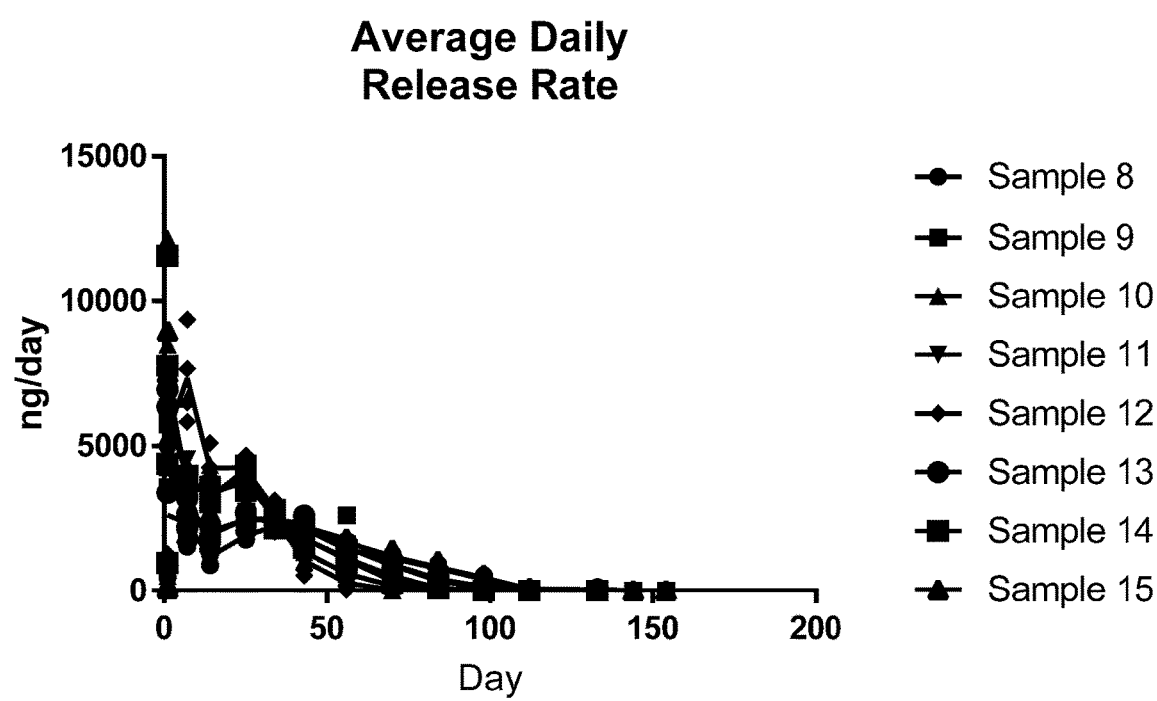
FIG. 1 is a graph that plots the average daily release of dexamethasone from various pharmaceutical compositions of the present invention (samples 8-15).

The present invention provides new pharmaceutical compositions and therapeutic agent delivery systems, namely intravitreal implants, as well as methods of making and using such systems for extended release of at least one therapeutic agent in a substantially linear manner into an eye. A new series of degradable polymeric matrices were prepared by blending a biodegradable poly(D,L-lactide) polymer, a biodegradable poly(D,L-lactide-co-glycolide) polymers, and a polyester amide. A pharmaceutical composition of the present invention extends to a biodegradable therapeutic agent delivery system comprising a polymer matrix and a therapeutic agent contained in the polymer matrix. Intravitreal implants have been developed from a pharmaceutical composition of the present invention using the PRINT® technology that deliver a high sustained concentration of at least one therapeutic agent in a substantially linear manner over a period of up to 5 months in vitro. The present invention further extends to biodegradable intravitreal implants with highly uniform, tunable and reproducible size, shape, loading, composition, and load distribution and a desired extended therapeutic agent release profile, making them useful in the treatment of a variety of ocular diseases or disorders.

The present invention is based upon the discovery that surprisingly and unexpectedly, creating a polymer matrix comprising a PEA polymer, as well as PLGA polymer and/or PLA polymer, or a combination thereof, as well as at least one therapeutic agent contained within the polymer matrix, results in the release of the at least one therapeutic agent in a substantially linear manner for at least 3 months, 4 months, 5 months, 6 months, or longer. Although under no obligation explain the amount of therapeutic agent released, or the substantially linear manner in which a therapeutic agent is released from a pharmaceutical composition of the invention for the durations stated herein, and certainly not wishing to be bound by any explanation, it is postulated that when two or more different classes of polymers are mixed producing a unique new polymer matrix, different degrees of phase separated blend can be obtained, depending on the thermodynamic properties and compatibilities of polymers chosen to form the polymer matrix. By varying the ratios of the polymers used in a polymer matrix, i.e., between the first polymer and the second (as well as modulating the amount of ingredients of the $2^{nd}$ polymer) the hydrophobicity of the polymer matrix can be modulated. Moreover, a pharmaceutical composition with a claimed polymer matrix released the at least one therapeutic agent in a substantially linear manner. This modulation of the hydrophobicity, as well as modulating the amount of therapeutic agent contained in the polymer matrix, enables one to modulate the amount of therapeutic agent released in a substantially linear manner, as well as duration during which such release in a substantially linear manner occurs. Thus, the present invention permits the designing of a pharmaceutical composition to release a therapeutic agent in a substantially linear manner for a particular duration.

Broadly, the present invention extends to pharmaceutical compositions for treating an ocular disease or disorder. Such a pharmaceutical composition of the present invention comprises a biodegradable polymer matrix that comprises a mixture of a first polymer and a second polymer, wherein the first polymer is a biodegradable polyester amide, and the second polymer is selected from (a) a biodegradable poly (D,L-lactide) polymer, (b) a biodegradable poly (D,L-lactide-co-glycolide) copolymer, and (c) a combination of (a) and (b). A pharmaceutical composition of the present invention further comprises at least one therapeutic agent homogenously dispersed within the polymer matrix, wherein the pharmaceutical composition is formulated to release the at least one therapeutic agent from the pharmaceutical composition in a substantially linear manner for at least about 1 month, about 2 months, about 3 months, about 4 months, about 5 months, or about 6 months or more. Optionally, a pharmaceutical composition can be formulated into an intravitreal implant for intravitreal administration to a subject's eye. The PRINT® technology, which is described and discussed infra, can be used to produce such intravitreal implants of the invention.

Numerous terms and phrases are used throughout the instant specification and claims and are defined below.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention.

It is also stated that the reagents described herein are merely exemplary and that equivalents of such are known in the art.

As used herein, the term "alkyl," by itself or as part of another substituent means, unless otherwise stated, a straight or branched chain hydrocarbon having the number of carbon atoms designated (i.e., $C_{1-6}$ means one to six carbon atoms) and includes straight, branched chain, or cyclic substituent groups. Examples include, but are not limited to, methyl, ethyl, propyl, isopropyl, butyl, isobutyl, tert-butyl, pentyl, neopentyl, hexyl, and cyclopropylmethyl. Most preferred is $(C_{1-6})$alkyl, particularly ethyl, methyl, isopropyl, isobutyl, n-pentyl, n-hexyl and cyclopropylmethyl.

As used herein, "alkenyl" refers to an unsaturated aliphatic hydrocarbon moiety including straight chain and branched chain groups. Alkenyl moieties must contain at least one alkene. "Alkenyl" may be exemplified by groups such as ethenyl, n-propenyl, isopropenyl, n-butenyl and the like. Alkenyl groups may be substituted or unsubstituted. More than one substituent may be present. When substituted, the substituent group is preferably alkyl, halogen or alkoxy. Substituents may also be themselves substituted. Substituents can be placed on the alkene itself and also on the adjacent member atoms or the alkynyl moiety.

As used herein, "alkynyl" refers to an unsaturated aliphatic hydrocarbon moiety including straight chain and branched chain groups. Alkynyl moieties must contain at least one alkyne. "Alkynyl" may be exemplified by groups such as ethynyl, propynyl, n-butynyl and the like. Alkynyl groups may be substituted or unsubstituted. More than one substituent may be present. When substituted, the substituent group is preferably alkyl, amino, cyano, halogen, alkoxyl or hydroxyl. Substituents may also be themselves substituted. Substituents are not on the alkyne itself but on the adjacent member atoms of the alkynyl moiety.

As used herein, the term "aryl," employed alone or in combination with other terms, means, unless otherwise stated, a carbocyclic aromatic system containing one or more rings (typically one, two or three rings), wherein such rings may be attached together in a pendent manner, such as a biphenyl, or may be fused, such as naphthalene. Examples of aryl groups include phenyl, anthracyl, and naphthyl. Preferred examples are phenyl and naphthyl, most preferred is phenyl.

As used herein, the number of carbon atoms in a substituent can be indicated by the prefix "$C_{x-y}$," or "$C_x$-$C_y$,"

where x is the minimum and y is the maximum number of carbon atoms in the substituent.

As used herein, a "protecting group" refers to those protection group moieties described in, for example, Protective Groups in Organic Synthesis (T. Green and P. Wuts; 3rd Edition; John Wiley and Sons, 1999). For example, a carboxylic acid group may be protected as an ester, for example, as: an alkyl ester (e.g., a methyl ester; a t-butyl ester); a haloalkyl ester (e.g., a haloalkyl ester); a trisalkylsilylalkyl ester; or an arylalkyl ester (e.g., a benzyl ester; a nitrobenzyl ester); or as an amide, for example, as a methyl amide.

The term "treatment" refers to the application of one or more specific procedures used for the amelioration of a disease. In certain embodiments, the specific procedure is the administration of one or more pharmaceutical agents. "Treatment" of an individual (e.g. a mammal, such as a human) or a cell is any type of intervention used in an attempt to alter the natural course of the individual or cell. Treatment includes, but is not limited to, administration of a pharmaceutical composition, and may be performed either prophylactically or subsequent to the initiation of a pathologic event or contact with an etiologic agent. Treatment includes any desirable effect on the symptoms or pathology of a disease or condition, and may include, for example, minimal changes or improvements in one or more measurable markers of the disease or condition being treated. Also included are "prophylactic" treatments, which can be directed to reducing the rate of progression of the disease or condition being treated, delaying the onset of that disease or condition, or reducing the severity of its onset. An "effective amount" or "therapeutically effective amount" refers to an amount of a therapeutic agent, administered to a mammalian subject, either as a single dose or as part of a series of doses, which is effective to produce a desired therapeutic effect.

As used herein, "pharmaceutically acceptable salts" refers to derivatives of the disclosed compounds wherein the parent compound is modified by converting an existing acid or base moiety to its salt form. Lists of suitable salts are found in Remington's Pharmaceutical Sciences, 17th ed., Mack Publishing Company, Easton, Pa., 1985, p. 1418 and Journal of Pharmaceutical Science, 66, 2 (1977), each of which is incorporated herein by reference in its entirety.

As used herein, the singular form of "a", "an" and "the" include plural references unless the context clearly dictates otherwise.

As used herein, the term "comprising" is intended to mean that the compositions and methods include the recited elements, but do not exclude others.

"About" and "approximately" are interchangeable, and mean plus or minus a percentage (e.g., ±5%) of the number, parameter, or characteristic so qualified, which would be understood as appropriate by a skilled artisan to the scientific context in which the term is utilized. Furthermore, all numbers, values, and expressions referring to quantities used herein, are subject to the various uncertainties of measurement encountered in the art. Thus, unless otherwise indicated, all presented values may be understood as modified by the term "about."

Where a numerical range is disclosed herein, then such a range is continuous, inclusive of both the minimum and maximum values of the range, as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all subranges subsumed therein. For example, a stated range of from "1 to 10" should be considered to include any and all subranges between the minimum value of 1 and the maximum value of 10.

As used herein, "therapeutic agent" refers to a compound or substance in a pharmaceutical composition that is biologically active and produces the effects of the pharmaceutical composition.

As used herein, the term "pharmaceutical composition" refers to a composition that comprises a therapeutic agent, excipient, a carrier, etc. Generally, pharmaceutical compositions are administered to a patient rather than the therapeutic agent alone.

As used herein, "eye disease or disorder" or "ocular disease or disorder" can be used interchangeably, and include, but are not limited to glaucoma, allergy, inflammatory eye diseases or disorders, ocular hypertension, cancers of the eye, neurodegenerative diseases or disorders of the eye such as diabetic macular edema (DME) and wet or dry age-related macular degeneration (AMD), uveitis, diabetic retinopathy, and dry eye.

As used herein, "kinase" is a type of enzyme that transfers a phosphate group from a high-energy donor, such as ATP, to a specific target molecule (substrate). The process is called phosphorylation.

As used herein "receptor tyrosine kinase (RTK)" refers to a receptor protein having intracellular kinase activity and being selected from the RTK family of proteins described in Schlessinger, Cell, 103: 211-225 (2000). "Receptor tyrosine kinase dimer" means a complex in a cell surface membrane comprising two receptor tyrosine kinase proteins. In some aspects, a receptor tyrosine kinase dimer may comprise two covalently linked receptor tyrosine kinase proteins. RTK dimers of particular interest are Her receptor dimers and VEGFR dimers. Receptor tyrosine kinases are an important class of receptor that are involved in many fundamental cellular processes including cell proliferation, survival, metabolism, and migration, e.g. Schlessinger, Cell, 103: 211-225 (2000). Prominent families of this class include epidermal growth factor receptor (EGFR or Her1), platelet-derived growth factor receptor (PDGFR), fibroblast growth factor receptor (FGFR), and vascular endothelial growth factor receptor (VEGFR). The class of receptor tyrosine kinases is so named because when activated by dimerization, the intracellular domain of RTKs acquire tyrosine kinase activity that can, in turn, activate a variety of signal transduction pathways. Consequently, RTKs are essential components of signal transduction pathways that mediate cell-to-cell communication and their function as relay points for signaling pathways. They have a key role in numerous processes that control cellular proliferation and differentiation, regulate cell growth and cellular metabolism, and promote cell survival and apoptosis. Because of this property, many receptor tyrosine kinases have been used as targets for drug development, and several promising clinical-phase therapeutic agents, such as IRESSA® (gefitinib) and TARCEVA® (erlotinib), which have been designed to inhibit RTK activity, e.g. Taxler, Expert Opin. Ther. Targets, 7: 215-234 (2003). The availability of convenient methods for measuring pathway activation would lead to better understanding of therapeutic agent mechanisms, and to better therapeutic agent selection and disease management (Mirshafiey et al., Innov. Clin. Neursci. (11(7-8):23-26 (2014)).

As used herein, a Janus kinase (JAK) refers a cytoplasmic tyrosine kinase that transduces cytokine signaling from membrane receptors to STAT transcription factors. Four JAK family members have been described: JAK1, JAK2, JAK3 and TYK2. Upon binding of the cytokine to its receptor, JAK family members auto- and/or trans phosphorylate each other, followed by phosphorylation of STATs, and then migrate to the nucleus to modulate transcription. JAK-STAT intracellular signal transduction is suitable for the interferons, most interleukins, as well as a variety of cytokines and endocrine factors such as EPO, TPO, GH, OSM, LIF, CNTF, GM-CSF and PRL (Vainchenker W. et al. (2008)).

The JAK family is involved in intracellular signal transduction from >70 different cytokines. Cytokines bind to their cell surface receptors resulting in receptor dimerization and subsequent activation/phosphorylation of JAK tyrosine kinases. The JAKs are either constitutively associated with the receptor or are recruited upon cytokine binding. Specific tyrosine residues on the receptor are then phosphorylated by activated JAKs and serve as docking sites for STAT proteins. STATs are phosphorylated by JAKs, dimerize, then translocate to the nucleus where they bind specific DNA elements and activate gene transcription. JAK1 signals in conjunction with all JAK isoforms in a cytokine dependent manner.

JAKs are essential for multiple physiological functions, and this essential function of JAKs has been demonstrated using genetically engineered mouse models that are deficient in specific JAKs. Jak1$^{-/-}$ mice die perinatally, while Jak2$^{-/-}$ mice have deficiencies in erythropoiesis and die around day E12. Jak3$^{-/-}$ mice are viable but have a SCID phenotype with deficiencies in T cells, B cells and NK cells. TYK2$^{-/-}$ mice exhibit features of hyper IgE syndrome. These phenotypes demonstrate the essential and non-redundant roles of JAK activity in vivo (K. Ghoreschi, A. Laurence, J. J. O'Shea, Immunol. Rev. 228, 273 (2009)).

Furthermore, mutations in the JAK enzymes have been associated with diseases in humans. Inactivating mutations in JAK3 (or the cognate common gamma chain cytokine receptor) cause a severe SCID phenotype (J. J. O'Shea, M. Pesu, D. C. Borie, P. S. Changelian, Nat. Rev. Drug Discov. 3, 555 (2004)). Deletions of TYK2 result in hyper IgG syndrome and increased infection risk (Y. Minegishi et al., Immunity. 25, 745 (2006)). No inactivating mutations have been reported for JAK1 or JAK2, consistent with the data from mice that demonstrates that JAK1 and JAK2 deficient mice are not viable. However, several mutations that result in constitutively active JAK2 have been identified, resulting in myeloproliferative diseases and confirming the central role of JAK2 in hematopoiesis (O. bdel-Wahab, Curr. Opin. Hematol. 18, 117 (2011)). JAK2 is the sole JAK family member involved in signal transduction of the critical hematopoietic cytokines IL-3, GMCSF, EPO and TPO.

In addition, JAKs play multiple roles downstream of cytokine signaling in both immune and non-immune cells. Autoimmunity is driven by an aberrant adaptive immune response to self-antigens and JAK-STAT (signal transducer and activator of transcription) signaling is known to play a key role in this process. Thus, JAK inhibitors may have considerable potential for the development of therapeutic agents to treat autoimmunity. JAK3 is an especially attractive target as, unlike other JAKs, its expression is restricted to the immune system.

Since a considerable body of literature has accumulated that link the JAK/STAT pathway to various diseases and disorders including hyperproliferative disorders and cancer such as leukemia and lymphomas, immunological and inflammatory disorders such as transplant rejection, asthma, chronic obstructive pulmonary disease, allergies, rheumatoid arthritis, type I diabetes, amyotrophic lateral sclerosis, ocular diseases or disorders, and multiple sclerosis, they have been the target of the development of numerous therapeutic agents to modulate, and in particular inhibit their activity As used herein a "Rho-associated protein kinase" or "Rho kinase" (ROCK) is a key intracellular regulator of cytoskeletal dynamics and cell motility. Rho-kinase regulates a number of downstream targets of Rho A through phosphorylation, including, for example, myosin light chain, the myosin light chain phosphatase binding subunit and LIM-kinase 2. These substrates regulate actin filament organization and contractility. In smooth muscle cells Rho-kinase mediates calcium sensitization and smooth muscle contraction. Inhibition of Rho-kinase blocks 5-HT and phenylephrine agonist induced muscle contraction. When introduced into non-smooth muscle cells, Rho kinase induces stress fiber formation and is required for the cellular transformation mediated by Rho A. Rho kinase participates in a variety of cellular processes, including but not limited to cell adhesion, cell motility and migration, growth control, cell contraction, and cytokinesis. Rho kinase is also involved in Na/H exchange transport system activation, stress fiber formation, adducin activation, and physiological processes such as vasoconstriction, bronchial smooth muscle constriction, vascular smooth muscle and endothelial cell proliferation, platelet aggregation, and others.

Inhibition of Rho-kinase activity in animal models has demonstrated a number of benefits of Rho-kinase inhibition for the treatment of human diseases. These include models of cardiovascular diseases such as hypertension, atherosclerosis, restenosis, cardiac hypertrophy, ocular hypertension, cerebral ischemia, cerebral vasospasm, penile erectile dysfunction, central nervous system disorders such as neuronal degeneration and spinal cord injury, and in neoplasia. Inhibition of Rho-kinase activity has been shown to inhibit tumor cell growth and metastasis, angiogenesis, arterial thrombotic disorders such as platelet aggregation and leukocyte aggregation, asthma, regulation of intraocular pressure, and bone resorption. The inhibition of Rho-kinase activity in patients has benefits for controlling cerebral vasospasms and ischemia following subarachnoid hemorrhage, reduction of intraocular pressure, increase in ocular aqueous outflow by relaxation of trabecular meshwork tissue, improving blood flow to the optic nerve, treating glaucoma, lowering intra-ocular pressure (IOP), and protection of healthy ganglion cells.

In mammals, Rho-kinase consists of two isoforms, ROCK1 (ROCKβ.; p160-ROCK) and ROCK2 (ROCKα). ROCK1 and ROCK2 are differentially expressed and regulated in specific tissues. For example, ROCK1 is ubiquitously expressed at relatively high levels, whereas ROCK2 is preferentially expressed in cardiac and brain and skeletal muscle. The isoforms are also expressed in some tissues and in a developmental stage specific manner. ROCK1 is a substrate for cleavage by caspase-3 during apoptosis, whereas ROCK2 is not. Smooth muscle specific basic calponin is phosphorylated only by ROCK2.

Given the extent of involved cellular processes and diseases, compounds that selectively inhibit one rho kinase, or inhibit ROCK1 and ROCK2, are desired. Examples of rho kinase inhibitor therapeutic agents include netarsudil or a pharmaceutically acceptable salt thereof (e.g., "RHOPRESSA®"), which lowers IOP and is used for the treatment of glaucoma, and ripasudil or a pharmaceutically acceptable salt thereof (e.g., "GLANATEC®"), used for the treatment of glaucoma and ocular hypertension. In some embodiments, biologically-active metabolites of such Rho kinase inhibitors are desired.

As used herein, a "prostaglandin" refers to any compound having a prostanoic acid skeleton:

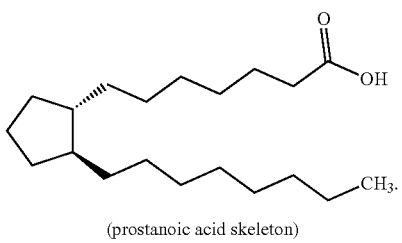 [SMILES: CCCCCCCC[C@H]1CCC[C@@H]1CCCCCCC(=O)O]

(prostanoic acid skeleton)

Such compounds, as well as analogs or derivatives thereof, possess ocular hypotensive activity and thus, have applications in treating or ameliorating an ocular disease or disorder.

Another type of therapeutic agent having applications in a pharmaceutical composition (for example, in an intravitreal implant) of the present invention is a corticosteroid, as well as analogs or derivatives thereof, or a salt or prodrug thereof. As used herein, "corticosteroid" is a class of steroid hormones produced in the adrenal cortex of vertebrates, as well as synthetic analogs and derivatives of these hormones. Two types of corticosteroids, e.g. glucocorticoids and mineralocorticoids, are involved in a wide range of physiological process. It has been reported that corticosteroids have applications in treating ocular diseases and disorders, particularly inflammatory ocular diseases and disorders.

As used herein, "therapeutically effective amount" means a level or amount of a therapeutic agent needed to treat a disease or disorder, i.e., the level or amount of a therapeutic agent that produces a therapeutic response or desired effect in the subject to which the therapeutic agent was administered. In a particular embodiment of the invention, a therapeutically effective amount means a level or amount of a therapeutic agent needed to treat an ocular disease or disorder.

The present invention further extends to an intravitreal implant manufactured from a pharmaceutical composition of the present invention for placement at or into the posterior of the human eye. In these embodiments, the release in a substantially linear manner of therapeutic agent from the implant achieves a concentration of therapeutic agent in the vitreous of the patient's eye that treats an ocular disease or disorder for the duration in which the implant is designed to release the therapeutic agent in a substantially linear manner.

In certain embodiments, the implants described herein are engineered in size, shape, and composition to provide maximal approximation of the implant to the iridocorneal angle of a human eye. In certain embodiments, the implants are made of a pharmaceutical composition of the present invention, which includes a polymer matrix as described herein.

As used herein, the term "polymer" is meant to encompass homopolymers (polymers having only one type of repeating unit) and copolymers (a polymer having more than one type of repeating unit).

A "biodegradable polymer" or "bioerodible polymer" can be used interchangeably, and mean a polymer that degrades in vivo, under physiological conditions. The release of at least one therapeutic agent occurs concurrent with, or subsequent to, the degradation of a biodegradable polymer over time. A biodegradable polymer may be a homopolymer or a copolymer.

As used herein, the term "polymer matrix" refers to a homogeneous mixture of polymers. In other words, the matrix does not include a mixture wherein one portion thereof is different from the other portion by ingredient, density, etc., Thus, polymer matrix does not include a composition containing a core and one or more outer layers, nor a composition containing a therapeutic agent reservoir and one or more portions surrounding the therapeutic agent reservoir. In a pharmaceutical composition of the present invention, a polymer matrix comprises a first polymer and a second polymer, wherein the first polymer comprises a polyester amide polymer (PEA), and the second polymer comprises a PLA polymer, a PLGA polymer, or a combination of a PLA polymer and a PLGA polymer, e.g.:
  (i) a biodegradable poly(D,L-lactide) polymer;
  (ii) a biodegradable poly (D,L-lactide-co-glycolide) polymer; or
  (iii) a combination of (i) and (ii).

Polymers used in a polymer matrix of a pharmaceutical composition of the present invention have independent properties associated with them that when combined provide the properties needed to provide the release of a therapeutically effective amount of a therapeutic agent in a substantially linear manner, for the desired duration.

Such polymers are often subject to enzymatic or hydrolytic instability. Water soluble polymers may be cross-linked with hydrolytic or biodegradably unstable cross-links to provide useful water insoluble polymers. The degree of stability can be varied widely, depending upon the choice of monomer, whether a homopolymer or copolymer is employed, employing mixtures of polymers, and whether the polymer includes terminal acid groups.

Equally important to controlling the biodegradation of the polymer and hence the extended release profile of a pharmaceutical composition of the present invention is the relative average molecular weight of the polymer matrix employed in an intravitreal implant of the present invention. Different molecular weights of the same or different polymeric compositions may be included to modulate the release profile of the at least one therapeutic agent.

A number of methods of forming a polymer matrix are known to one of ordinary skill in the art, including but not limited to melt blending, solution blending, partial block or graft copolymerization, and preparation of interpenetrating polymer networks (IPN). "Melt mixing" involves mixing the first and second polymers together while they are in a molten state. It involves the use of shear force, extensional force, compressive force, ultrasonic energy, electromagnetic energy, thermal energy or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or the like, or combinations comprising at least one of the foregoing machines.

Solution blending may also be used to manufacture a polymer matrix, wherein the polymers are put into solution and blended. The solution blending may also use additional energy such as shear, compression, ultrasonic vibration, or the like, to promote homogenization of quantum dots with a hydrogel. In one embodiment, the hydrogel is suspended in a fluid (e.g., water, an alcohol, or the like) is introduced into an ultrasonic sonicator along with the quantum dots. The mixture may be solution blended by sonication for a time period effective to disperse the quantum dots into the hydrogel. The hydrogel with the quantum dots may then be dried, extruded and molded if desired. During the extrusion, the temperature of the hydrogel may be raised to facilitate the crosslinking to take place. The fluid that is used to swell the hydrogel may be removed during the extrusion process by using a vacuum on the extruder.

In a particular embodiment, a polymer matrix of the invention is produced from the mechanical mixing of polymers.

In embodiments, a polymer matrix may be formed from any combination of polylactic acid, glycolic acid as well as co-polymers thereof, and a polyester amide, which provides for release of the at least one therapeutic agent in a substantially linear manner into the eye over time. More importantly, one of ordinary skill in the art can engineer a polymer matrix used in a pharmaceutical composition of the present invention in order to deliver the at least one therapeutic agent in a substantially linear manner for at least about 1 month, at least about 2 months, at least about 3 months, at least about 4 months, at least about 5 months, at least about 6 months, or more.

As used herein, "substantially linear manner" means the first 90% of therapeutic agent released from a pharmaceutical composition of the present invention will have $R^2$ value of 0.9 or greater. In some embodiments, the first 80% of therapeutic agent released from a pharmaceutical composition of the present invention will have $R^2$ value of 0.9 or greater.

Suitable polymeric materials or compositions for use in the implants include those materials which are compatible, and biocompatible with the eye so as to cause no substantial interference with the functioning or physiology of the eye. Such polymeric materials may be biodegradable or bioerodible. Examples of useful polymeric materials include, without limitation, such materials derived from and/or including organic esters and organic ethers, which when degraded result in physiologically acceptable degradation products. Also, polymeric materials derived from and/or including, anhydrides, amides, orthoesters and the like, by themselves or in combination with other monomers, may also find use in the present invention. The polymeric materials may be addition or condensation polymers. The polymeric materials may be cross-linked or non-cross-linked. For some embodiments, besides carbon and hydrogen, the polymers may include at least one of oxygen and nitrogen. The oxygen may be present as oxy, e.g. hydroxy or ether, carbonyl, e.g. non-oxo-carbonyl, such as carboxylic acid ester, and the like. The nitrogen may be present as amide, cyano, amino, or any combination thereof In one embodiment, polymers of hydroxyaliphatic carboxylic acids, either homopolymers or copolymers, and polysaccharides are useful in the implants. Polyesters can include polymers of D-lactic acid, L-lactic acid, racemic lactic acid, glycolic acid, polycaprolactone, co-polymers thereof, and combinations thereof.

Some characteristics of the polymers or polymeric materials for use in embodiments of the present invention may include biocompatibility, compatibility with the selected at least one therapeutic agent, ease of use of the polymer in making the therapeutic agent delivery systems described herein, a desired half-life in the physiological environment, and hydrophilicity.

A particular example of a polymer having applications in a polymer matrix used in the manufacture of a pharmaceutical composition (for example, an intravitreal implant) of the present invention is a synthetic aliphatic polyester, for example, a polymer of lactic acid and/or glycolic acid, and includes poly-(D,L-lactide) (PLA), poly-(D-lactide), poly-(L-lactide), polyglycolic acid (PGA), and/or the copolymer poly-(D, L-lactide-co-glycolide) (PLGA).

PLGA is synthesized through random ring-opening co-polymerization of the cyclic dimers of glycolic acid and lactic acid. Successive monomeric units of glycolic or lactic acid are linked together by ester linkages.

PLGA and PLA polymers are known to degrade via backbone hydrolysis (bulk erosion) and the final degradation products are lactic and glycolic acids, which are nontoxic and considered natural metabolic compounds. Lactic and glycolic acids are eliminated safely via the Krebs cycle by conversion to carbon dioxide and water. The biocompatibility of PLA, PGA and PLGA polymers has been further examined in both non-ocular and ocular tissues of animals and humans. The findings indicate that the polymers are well tolerated. Moreover, PLA, PGA, and PLGA can include terminal esters or acids.

Examples of PLA polymers, which may be utilized in an embodiment of the invention, include the RESOMER® Product line available from Evonik Industries identified as, but are not limited to, R207S, R202S, R202H, R203S, R203H, R205S, R208, R206, and R104. Examples of suitable PLA polymers include both acid and ester terminated polymers with inherent viscosities ranging from approximately 0.15 to approximately 2.2 dL/g when measured at 0.1% w/v in CHCl3 at 25° C. with an Ubbelhode size 0c glass capillary viscometer.

The synthesis of various molecular weights and of various inherent viscosities of PLA is possible. For example, and not by limitation, in one embodiment, PLA, such as RESOMER® R208S, with an inherent viscosity of approximately 1.8 to approximately 2.2 dL/g, can be used. In another embodiment, PLA, such as RESOMER® R203S, with an inherent viscosity of approximately 0.25 to approximately 0.35 dL/g can be used. In yet another embodiment, PLA, such as RESOMER® R205S, with an inherent viscosity of approximately 0.55 to approximately 0.75 dL/g can be used.

Examples of PGA polymers, which may be utilized in an embodiment of the invention, include the RESOMER® Product line available from Evonik Industries identified as, but are not limited to, G205S. Other examples of suitable PGA polymers include both acid and ester terminated polymers. In some embodiments, the inherent viscosities of the PGA polymers range from approximately 1.05 to approximately 1.25 dL/g when measured at 0.1% w/v in CHCl3 at 25° C. with an Ubbelhode size 0c glass capillary viscometer.

Examples of PLGA polymers, which may be utilized in an embodiment of the invention, include the RESOMER® Product line from Evonik Industries identified as, but are not limited to, RG502, RG502S, RG502H, RG503, RG503H, RG504, RG504H, RG505, RG506, RG653H, RG752H, RG752S, RG753H, RG753S, RG755, RG755S, RG756, RG756S, RG757S, RG750S, RG858, and RG858S. Such PLGA polymers include both acid and ester terminated polymers with inherent viscosities ranging from approximately 0.14 to approximately 1.7 dL/g when measured at 0.1% w/v in CHCl3 at 25° C. with an Ubbelhode size 0c glass capillary viscometer. Example polymers used in various embodiments of the invention may include variation in the mole ratio of D,L-lactide to glycolide from approximately 50:50 to approximately 85:15, including, but not limited to, 50:50, 65:35, 75:25, and 85:15.

Other examples of PLGA polymers which may be utilized in an embodiment of the invention include those produced by Lakeshore Biomaterials identified as, but are not limited to, DLG 1A, DLG 3 A, or DLG 4A. Such DLG polymers include both acid (A) and ester (E) terminated polymers with inherent viscosities ranging from approximately 0.0.5 to approximately 1.0 dL/g when measured at 0.1% w/v in CHCl3 at 25° C. with an Ubbelhode size 0c glass capillary viscometer. Example polymers used in various embodiments of the invention may include variation in the mole ratio of D,L-lactide to glycolide from approximately 1:99 to approximately 99:1, including, but not limited to, 50:50, 65:35, 75:25, and 85:15.

RESOMERS® identified by an "RG" or "DLG" in the product name, such as RG752S, is a poly(D,L-lactide-co-glycolide) or PLGA having the general structure (V):

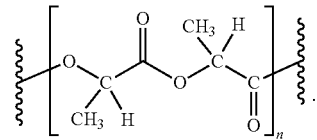

(V)

The synthesis of various molecular weights of DLG with various D,L-lactide-glycolide ratios is possible. In one embodiment, DLG, such as 1A, with an inherent viscosity of approximately 0.05 to approximately 0.15 dL/g can be used. In another embodiment, DLG, such as 2A, with an inherent viscosity of approximately 0.15 to approximately 0.25 dL/g can be used.

Poly(D,L-lactide-co-glycolide) or PLGA copolymers can be synthesized at different ratios of lactide to glycolide, such as a lactide:glycolide ratio of 75:25. These copolymers can be an ester-terminated PLGA copolymer, as identified by the terminal "S" in the product name, or an acid-terminated PLGA copolymer, as identified by the terminal "H" in the product name.

Another biodegradable polymer having applications in an intravitreal implant of the present invention is a polyester amide (PEA). PEAs are disclosed in U.S. Pat. Nos. 9,896, 544 and 9,789,189, which are hereby incorporated by reference herein in their entireties. An example of a general structure of a PEA is chemical structure (I):

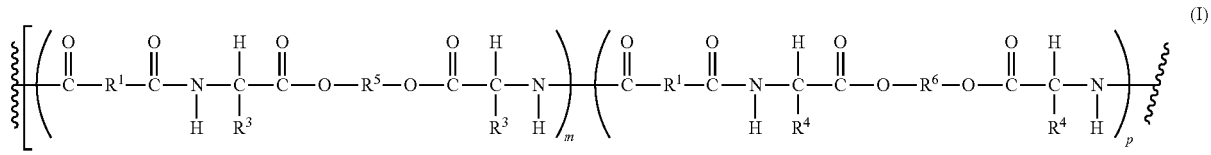

(I)

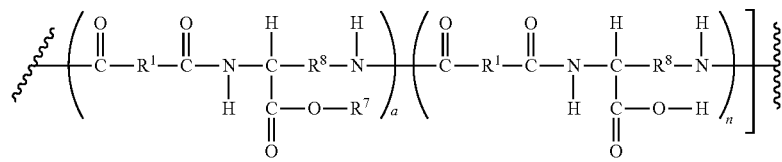

wherein:

m+p varies from 0.9-0.1 and a+b varies from 0.1 to 0.9;
m+p+a+b=1, wherein one of m or p could be 0;
n varies from 5 to 300 and wherein a is at least 0.01, b is at least 0.015 and the ratio of a to b (a:b) is from 0.1:9 to 0.85:0.15, wherein the m unit and/or p unit, and the a and b units, are randomly distributed;

$R^1$ is independently selected from $(C_2-C_{20})$alkyl;

$R^3$ and $R^4$ in a single backbone unit m or p, respectively, are independently selected from hydrogen, $(C_1-C_6)$ alkyl, $(C_2-C_6)$alkenyl, $(C_2-C_6)$alkynyl, $(C_6-C_{10})$aryl, $(C_1-C_6$ alkyl, $-(CH_2)SH$, $-(CH_2)_2S(CH)_3$, $(CH_3)_2-CH-CH_2-$, $-CH(CH_3)_2$, $-CH(CH_3)-CH_2-CH_3$, $-CH_2-C_6H_5$, $-(CH_2)_4-NH_2$, and mixtures thereof;

$R^5$ is independently selected from $(C_2-C_{20})$alkyl, $(C_2-C_{20})$ alkenylene;

$R^6$ is selected from bicyclic-fragments of 1,4:3,6-dianhydrohexitols of structural formula (II):

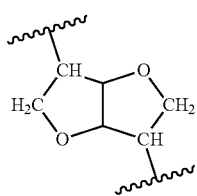 [SMILES: *C1COC2C(*)COC12]

$R^7$ is independently selected from the group consisting of $(C_6-C_{10})$ aryl, $(C_1-C_6)$alkyl or a protecting group; and $R^8$ is $-(CH_2)_4-$.

A particular example of a PEA having applications in the present invention has a chemical structure of:

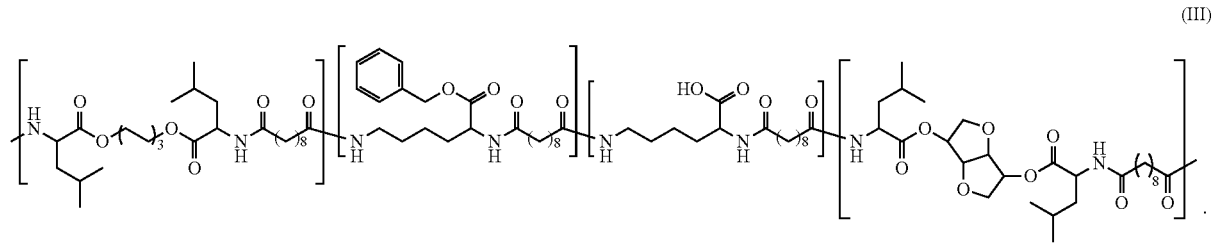

(III)

A PEA polymer having applications in a pharmaceutical composition (for example, an intravitreal implant) of the invention degrades hydrolytically via bulk erosion, and not enzymatically, and is completely biocompatible. Thus, its degradation will not cause any substantial interference with the functioning or physiology of the eye.

The ratio of PEA to lactide and glycolide, as well as the ratio between the amount of lactide and glycolide present in an implant of the present invention can be varied, altering the biodegradation characteristics of the product, enabling one or ordinary skill in the art to tailor the polymer degradation time as well as the duration and amount of therapeutic agent that is sustain released. Thus, altering and customizing the biodegradable polymer matrix changes the therapeutic agent delivery profile due to the postulated theory discussed above, which the inventors have no obligation to provide, and to which they are in no way bound.

The present invention further extends to compositions that include liquid formulations and delivery systems. Thus, the present compositions may be understood to include solutions, suspensions, emulsions, and the like, such as other liquid-containing compositions used in ophthalmic therapies.

Particle Suspension

As explained above, a pharmaceutical composition of the present invention can be formulated into a particle suspension. Particle suspensions, as used herein, are micronized pharmaceutical compositions formulated as a suspension in an aqueous phase containing necessary excipient, such as a delivery vehicle.

Moreover, liquid formulations can be particle suspensions. Particles are generally smaller than intravitreal implants disclosed herein and may vary in shape. For example, certain embodiments of the present invention use substantially cylindrical particles. A therapeutic agent delivery system of the present invention may comprise a population of such particles with a predetermined size distribution. In embodiments, suspension may comprise a population of particles having a desired diameter measurement As discussed above, polymer blends described herein can be used with particle suspensions. Thus, in embodiments, the above disclosed PLA, PGA, PLGA and PEA polymers can be formulated into a polymeric matrix as described herein, which can be combined with at least one therapeutic agent and formulated as a particle suspension for ocular administration. Additional agents including, but not limited to, tocopherol (e.g., α-tocopherol, β-tocopherol, γ-tocopherol, and δ-tocopherol) can be used in the particle suspensions described herein.

In embodiments, the particles have a size less than about 100 μm in any dimension. In embodiments, the largest dimensions may be from about 10 μm to about 100 μm, or about 12.5 μm to about 25 μm to about 50 μm. In other embodiments, the smallest dimension may be from about 10 μm to about 100 μm, or about 12.5 μm to about 25 μm. The PRINT® technology can readily be used to produce particles used in a particle suspension of the present invention. A pharmaceutical composition (for example, an intravitreal implant and a particle suspension) of the present invention comprise a therapeutic agent content of from about 1% to about 90%, or about 1% to about 80%, or about 1% to about 70%, or about 1% to about 60%, or about 1% to about 50%, or about 1% to about 40%, or about 1% to about 30%, or about 1% to about 20%, or about 1% to about 10%, or about 10% to about 50%, or about 10% to about 40%, or about 10% to about 30%, or about 10% to about 25%, or about 10% to about 23%, or about 10% to about 20%, or about 15% to about 35%, or about 15% to about 30%, or about 15% to about 25%.

Delivery vehicles can be used in the administration, via intravitreal injection, of the particle suspensions described herein. For example, a hyaluronic acid (HA) delivery vehicle can be used to formulate an injectable vehicle for administering a particle suspension, such as the one described in U.S. Pat. Nos. 7,582,311 and 7,651,703, which are incorporated herein by reference herein in their entireties. Hyaluronic acid (HA) is a polyanionic, polysaccharide that consists of N-acetyl-D-glucosamine and beta-glucuronic acid. The unique viscoelastic nature of HA along with its biocompatibility and non-immunogenicity has led to its use in a number of clinical applications, which include: the supplementation of joint fluid in arthritis; as a surgical aid in eye surgery; and to facilitate the healing and regeneration of surgical wounds. More recently, HA has been investigated as a therapeutic agent delivery agent for various routes of administration, including ophthalmic, nasal, pulmonary, parenteral and topical.

In embodiments, a particle suspension is delivered by an aqueous solution. In a particular embodiment, a particle suspension of the present invention is delivered by an aqueous solution containing sorbitol and hyaluronic acid (HA/sorbitol) vehicle. The aqueous solution comprises from about 0.1-99% HA and about 1-99% sorbitol, or about 0.1-50% HA, and about 20-90% sorbitol, or about 0.1-10% HA and about 40-60% sorbitol. In certain embodiments, the aqueous solution comprises about 1% HA and about 50% sorbitol.

Therapeutic Agent Release Profile Manipulation

The rate of therapeutic agent release from an intravitreal implant or particle suspension (for example, a pharmaceutical composition of the present invention) depends on several factors, including but not limited to the surface area of the implant, therapeutic agent content, and water solubility of the therapeutic agent, and speed of polymer degradation. As explained above, a critical aspect of determine the rate of therapeutic agent release, as well as its duration is the ratio of the amount of a first polymer used, e.g., a PEA to the amount of the second polymer used, e.g. (a) PLA, (b) PLGA, or (c) a combination of (a) and (b), as well as PGLA:PLA ratio, should polymer 2 be a combination of PLA and PLGA. Other factors involved include the lactide stereoisomeric composition (i.e., the amount of L- vs. DL-lactide), and molecular weight.

The versatility of PGA, PLA, PLGA and PEA allows for construction of delivery systems to tailor the therapeutic agent release for treating a variety of ocular diseases or disorders.

When the versatility of PGA, PLA, PLGA AND PEA polymers are combined with the manufacturing techniques of the present invention, i.e. PRINT® technology particle fabrication, then a host of custom tailored and highly consistent and predictable therapeutic agent release profiles can be created, which were not possible based upon the technology of the prior art, such as for example extrusion. The PRINT® technology, which is used to produce an intravitreal implant of the present invention as well as particles used in a particle suspension of the present invention, is described in Published PCT applications WO2007021762, WO2007024323, and WO2007030698, which are hereby incorporated by reference herein in their entireties.

The mold cavities used to fabricate intravitreal implants of the present invention may vary from the recited dimensions by ±about 50 μm, or ±about 40 μm, or ±about 30 μm, or ±about 20 μm, or ±about 10 μm, or ±about 5 μm, in various aspects.

With the PRINT® technology, intravitreal implants of the present invention can be manufactured that exhibit a therapeutic agent release profile that has highly reproducible characteristics from implant to implant. The therapeutic agent release profiles exhibited by various implants of the present invention are consistent implant to implant and demonstrate variation that is not statistically significant. Consequently, therapeutic agent release profiles demonstrated by embodiments of intravitreal implants of the present invention exhibit coefficients of variation that are within a confidence interval and does not impact the therapeutic delivery. The ability to produce implants that demonstrate such a high degree of consistent therapeutic agent loading or release is an advancement over the state of the art.

Suitable therapeutic agents, as well as an analog, derivative, pharmaceutically acceptable salt, zwitterion, polymorph or solvate thereof, homogenously dispersed within a polymer matrix described herein for use in various embodiments of the invention may be found in the Orange Book published by the Food and Drug Administration, which lists, among other things, therapeutic agents approved for treating ocular diseases or disorders.

An example of a therapeutic agent having applications in a pharmaceutical composition of the present invention, or an intravitreal implant or particle suspension made from a pharmaceutical composition of the present invention, is an inhibitor of a receptor tyrosine kinase (RTK), which is discussed above. Particular examples of RTK inhibitors having applications herein include, but are not limited gefitinib ("IRESSA®"), lapatinib ("TYKERB®" and "TYVERB®"), erlotinib ("TARCEVA®"), sunitinib malate ("SUTENT®"), sorafenib ("NEXAVAR"), regorafenib ("STIVARGA®"), vandetanib, afatinib ("GILOTRIF®"), axitinib ("INLYTA®"), semaxanib, cediranib ("RECENTIN"), neratinib ("NERLYNX®"), lestaurtinib, and tivoaznib ("FOTIVDA®").

Rho kinase inhibitors also have applications herein. Particular examples of such Rho kinase inhibitors having applications in a pharmaceutical composition of the present invention (for example, an intravitreal implant of the present invention) include, but are certainly not limited to netarsudil or a pharmaceutically acceptable salt thereof (e.g., "RHOPRESSA®"), which lowers IOP and is used to treat glaucoma, and ripasudil or a pharmaceutically acceptable salt thereof (e.g., "GLANATEC®"), used for the treatment of glaucoma and ocular hypertension.

Particular JAK inhibitors having applications in a pharmaceutical composition (for example, in an intravitreal implant of the present invention) for use in treating an ocular disease or disorder include, but are not limited to:

ruxolitinib ("JAKAFI®" and "JAKAVI®"), against JAK1/JAK2;
tofacitinib ("XELJANZ®" and "JAKVINUS") against JAK3;
oclacitinib ("APOQUEL®") against JAK1; and
baricitinib ("OLUMIANT®") against JAK1/JAK2.

Yet another example of a therapeutic agent having applications herein are corticosteroids, as well as analogs and derivatives thereof. Examples include, but are not limited to: dexamethasone, budesonide, beclomethasone, beclomethasone (e.g., as the mono or the dipropionate ester), flunisolide, fluticasone (e.g. as the propionate or furoate ester), ciclesonide, mometasone (e.g. as the furoate ester), mometasone desonide, rofleponide, hydrocortisone, prednisone, prednisolone, methyl prednisolone, naflocort, deflazacort, halopredone acetate, fluocinolone acetonide, fluocinonide, clocortolone, tipredane, prednicarbate, alclometasone dipropionate, halometasone, rimexolone, deprodone propionate, triamcinolone, betamethasone, fludrocortisone, desoxycorticosterone, rofleponide, etiprednol dicloacetate and the like.

Particular examples of corticosteroids, or analogs or derivatives thereof, having applications herein are:

(a) dexamethasone (having the chemical structure (V) immediately below):

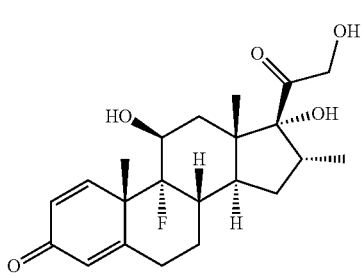

(V)

IUPAC Name: (8S,9R,10S,IIS,13S,14S,16R,17R)-9-Fluoro-n,17-dihydroxy-17-(2-hydroxyacetyl)-10,13,16-trimethyl-6,7,8,9,10,II,12,13,14,15,16,17-dodecahydro-3H-cyclopenta[a]phenanthren-3-one; and (b) fluocinolone acetonide (chemical structure (VI) immediately below):

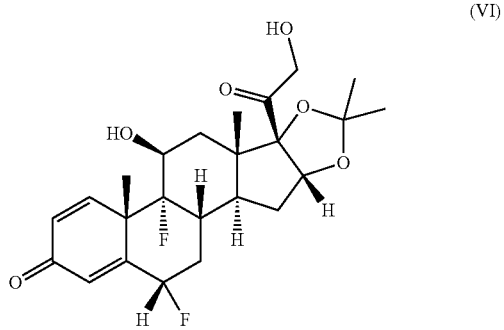

(VI)

IUPAC Name: (1S,2S,4R,8S,9S,1IS,12R,13S,19.3/4-12,19-difluoro-II-hydroxy-8-(2-hydroxyacetyl)-6,6,9,13-tetramethy 1-5,7-dioxapentacyclo[10.8.0.0<2,9>0.0<48>0.0<13 18>]icosa-14,17-dien-16-one.

Prostaglandins, and analogs or derivatives thereof, having applications as a therapeutic agent in a pharmaceutical composition (for example, an intravitreal implant and a particle suspension) of the present invention include latanoprost, bimatoprost, travoprost, tafluprost, 3-hydroxy-2,2-bis (hydroxymethyl)propyl 7-((1r,2r,3r,5s)-2-((r)-3-(benzo[b] thiophen-2-yl)-3-hydroxypropyl)-3,5-dihydroxycyclopentyl)heptanoate (chemical structure (II)), cloprostenol isopropyl ester, 13,14-dihydrocloprostenol isopropyl ester, latanoprostene bunod, unoprostone, $PGF_{1\alpha}$ isopropyl ester, $PGF_{2\alpha}$ isopropyl ester, $PGF_{3\alpha}$ isopropyl ester, fluprostenol, or any combination thereof. In some embodiments, the prostaglandins, and analogs or derivatives thereof, having applications as a therapeutic agent include dukeprost, tiaprost, or both. In some embodiments, the prostaglandins, and analogs or derivatives thereof, having applications as a therapeutic agent include free acids, and pharmaceutically acceptable salts thereof, of the prostaglandins and analogs or derivatives thereof.

Other therapeutic agents having applications in a pharmaceutical composition of the present invention for treating an ocular disease or disorder, e.g. glaucoma, include but are not limited to beta blockers, miotics, alpha adrenergic agonists, or carbonic anhydrase inhibitors, and antimetabolites such as 5-fluorouracil or mitomycin C.

Naturally, a pharmaceutical composition of the invention can comprise a therapeutic agent, or a combination of two or more therapeutic agents, examples of which are discussed above. Moreover, analogs or derivatives, pharmaceutically acceptable salts, zwitterions, solvates, esters, and polymorphs of therapeutic agents, such as those discussed herein, have applications in a pharmaceutical composition of the present invention. As used herein, an "analog" is a compound having a structure similar to that of another compound (its "parent" compound) but differing from it in respect to a certain component. The analog can differ from its parent compound in one or more atoms, functional groups, or substructures, which are replaced with other atoms, groups, or substructures. Likewise, an analog of a parent compound can also be formed from the replacement of particular atoms of the parent compound with radioactive isotopes of those particular atoms. A "derivative" is a compound that can be imagined to arise or actually be synthesized from a parent compound by replacement of one atom with another atom or group of atoms.

As used herein, a "pharmaceutically acceptable salt" refers to an ionizable therapeutic agent that has been combined with a counter-ion to form a neutral complex.

The term "zwitterion" refers to a molecule or ion having, within itself, separate positively and negatively charged groups.

As used herein, a "polymorph" or "polymorphism" is the ability of a solid material to exist in more than one form or crystal. A crystal form may be referred to herein as being characterized by graphical data. Such data include, for example, powder X-ray diffractograms and solid-state NMR spectra. As is well-known in the art, the graphical data potentially provides additional technical information to further define the respective solid state form (a so-called "fingerprint") which can not necessarily be described by reference to numerical values or peak positions alone.

In a pharmaceutical composition (for example, an intravitreal implant and a particle suspension) of the present invention, a therapeutic agent is blended with a biodegradable polymer matrix to form a pharmaceutical composition. The amount of a therapeutic agent used in the pharmaceutical composition depends on several factors such as: biodegradable polymer matrix selection, therapeutic agent selection, desired rate of release in a substantially linear manner, duration of desired rate of release, configuration of pharmaceutical composition, and ocular PK, to name a few.

For example, overall therapeutic agent content of a pharmaceutical composition (for example, an intravitreal implant) of the present invention may comprise approximately about 0.1 to approximately 60.0 weight percent of the total pharmaceutical composition. In some embodiments, the therapeutic agent comprises from about 1% to about 90%, or about 1% to about 80%, or about 1% to about 70%, or about 1% to about 60%, or about 1% to about 50%, or about 1% to about 40%, or about 1% to about 30%, or about 1% to about 20%, or about 1% to about 10%, or about 10% to about 50%, or about 10% to about 40%, or about 10% to about 30%, or about 10% to about 25%, or about 10% to about 23%, or about 10% to about 20%, or about 15% to about 35%, or about 15% to about 30%, or about 15% to about 25%. All these percentages are in weight percentage. In a particular embodiment, dexamethasone comprises approximately 20.0 weight percent of the pharmaceutical composition.

A pharmaceutical composition of the present invention is prepared by dissolving a polymer matrix and therapeutic agent in a suitable solvent to create a homogeneous solution. For example, acetone, alcohol (e.g., methyl alcohol or ethyl alcohol), acetonitrile, tetrahydrofuran, chloroform, and ethyl acetate may be used as solvents. Other solvents known in the art are also contemplated. The solvent is then allowed to evaporate, leaving behind a homogeneous film. The solution can be aseptically filtered prior to evaporation of the solvent.

Fabrication of an Intravitreal Implant

As explained above, the present invention extends to a pharmaceutical composition of the present invention formulated in an intravitreal implant or particle suspension. Various methods may be used to produce an implant or particle suspension of the present invention. Such methods include, but are certainly not limited to solvent casting, phase separation, interfacial methods, molding, compression molding, injection molding, extrusion, co-extrusion, heat extrusion, die cutting, heat compression, and combinations thereof. In certain embodiments, the implants are molded, preferably in polymeric molds.

In particular embodiments, the implants of the present invention are fabricated through the PRINT® Technology (Liquidia Technologies, Inc.) particle fabrication. In particular, the implants are made by molding the materials intended to make up the implants in mold cavities.

The molds can be polymer-based molds and the mold cavities can be formed into any desired shape and dimension. Uniquely, as the implants and particles are formed in the cavities of the mold, the implants are highly uniform with respect to shape, size, and composition. Due to the consistency among the physical and compositional makeup of each implant of the present pharmaceutical compositions, pharmaceutical compositions of the present invention provide highly uniform release rates and dosing ranges. The methods and materials for fabricating the implants of the present invention are further described and disclosed in: U.S. Pat. Nos. 9,545,737, 9,214,590, 9,205,594, 8,992,992, 8,662878, 8,518,316, 8,444,907, 8,439,666, 8,420,124, 8,268,446, 8,263,129, 8,158,728, 8,128,393, and 7,976,759; U.S. Pat. Application Publications Nos. 2013-0228950, 2013-0011618, 2013-0256354, 2010-0003291, 2009-0165320, and 2008-0299174 (each of which is hereby incorporated by reference herein in its entirety).

The mold cavities can be formed into various shapes and sizes. For example, the cavities may be shaped as a prism, rectangular prism, triangular prism, pyramid, square pyramid, triangular pyramid, cone, cylinder, torus, or rod. The cavities within a mold may have the same shape or may have different shapes. In certain aspects of the invention, the shapes of the implants are a cylinder, rectangular prism, or a rod. In a particular embodiment, the implant is a rod. The rods may have only 90 degree angles, or they may bulge along their long axis, or they may be tapered such that one end is smaller than the other.

The mold cavities can be dimensioned from nanometer to micrometer to millimeter dimensions and larger. For certain embodiments of the invention, mold cavities are dimensioned in the micrometer and millimeter range. For example, cavities may have a smallest dimension of between approximately 50 nanometers and approximately 750 µm. In some aspects, the smallest mold cavity dimension may be between approximately 100 µm and approximately 300 µm. In other aspects, the smallest mold cavity dimension may be between approximately 125 µm and approximately 250 µm. In still other aspects, the smallest mold cavity dimension may be between approximately 10 µm and approximately 100 µm. In some aspects, the smallest mold cavity dimension may be between approximately 12.5 µm and approximately 50 µm, e.g., 25 µm and 30 µm. The mold cavities may also have a largest dimension of between approximately 750 µm and approximately 10,000 µm. In other aspects, the largest mold cavity dimension may be between approximately 1,000 µm and approximately 5000 µm. In other aspects, the largest mold cavity dimension may be between approximately 1,000 µm and approximately 3,500 µm. In still other aspects, the largest mold cavity dimension may be between approximately 25 µm and approximately 100 µm. In some aspects, the smallest mold cavity dimension may be between approximately 25 µm and approximately 50 µm, e.g., 25 µm and 30 µm.

In one embodiment, a mold cavity with dimensions of about 12.5 µm×about 12.5 µm.×about 25 µm (W×H×L) is utilized to fabricate the particles of a particle suspension of the present invention.

In one embodiment, a mold cavity with dimensions of about 25 µm×about 25 µm×about 25 µm (W×H×L) is utilized to fabricate particles of a particle suspension of the present invention.

In one embodiment, a mold cavity with dimensions of about 25 µm×about 25 µm×about 50 µm (W×H×L) is utilized to fabricate particles of particle suspension of the present invention.

In one embodiment, a mold cavity with dimensions of about 50 μm×about 50 μm×about 30 μm (W×H×L) is utilized to fabricate particles of particle suspension of the present invention.

In one embodiment, a mold cavity with dimensions of about 50 μm×about 50 μm×about 50 μm (W×H×L) is utilized to fabricate particles of particle suspension of the present invention.

In one embodiment, a mold cavity having generally a rod shape with dimensions of about 140 μm×about 140 μm×about 1325 μm (W×H×L) is utilized to fabricate an intravitreal implant of the present invention.

In a further embodiment, a mold cavity having a rod shape with dimensions of about 225 μm×about 225 μm×about 2965 μm (W×H×L) is used to fabricate an intravitreal implant of the present invention.

In another embodiment, a mold cavity having generally a rod shape with dimensions of about 395 μm×about 311 μm×about 6045 μm (W×H×L) is used to fabricate an intravitreal implant of the present invention.

In one embodiment, a mold cavity having generally a rod shape with dimensions of about 100 μm×about 100 μm×about 1500 μm (W×H×L) is utilized to fabricate an intravitreal implant of the present invention.

In a further embodiment, a mold cavity having a rod shape with dimensions of about 150 μm×about 150 μm×about 3150 μm (W×H×L) is used to fabricate an intravitreal implant of the present invention.

In another embodiment, a mold cavity having generally a rod shape with dimensions of about 180 μm×about 180 μm×about 3000 μm (W×H×L) is used to fabricate an intravitreal implant of the present invention.

In one embodiment, a mold cavity having generally a rod shape with dimensions of about 200 μm×about 200 μm×about 2000 μm (W×H×L) is utilized to fabricate an intravitreal implant of the present invention.

In a further embodiment, a mold cavity having a rod shape with dimensions of about 200 μm×about 200 μm×about 1000 μm (W×H×L) is used to fabricate an intravitreal implant of the present invention.

In another embodiment, a mold cavity having generally a rod shape with dimensions of about 225 μm×about 225 μm×about 2700 μm (W×H×L) is used to fabricate an intravitreal implant of the present invention.

In another embodiment, a mold cavity having generally a rod shape with dimensions of about 250 μm×about 250 μm×about 1500 μm (W H×L) is used to fabricate an intravitreal implant of the present invention.

In another embodiment, a mold cavity having generally a rod shape with dimensions of about 200 μm×about 200 μm×about 4500 μm (W×H×L) is used to fabricate an intravitreal implant of the present invention.

In another embodiment, a mold cavity having generally a rod shape with dimensions of about 265 μm×about 265 μm×about 4500 μm (W×H×L) is used to fabricate an intravitreal implant of the present invention.

In another embodiment, a mold cavity having generally a rod shape with dimensions of about 255 μm×about 255 μm×about 4500 μm (W×H×L) is used to fabricate an intravitreal implant of the present invention.

Once fabricated, the implants and particles may remain on an array for storage or may be harvested immediately for storage and/or utilization. Implants and particles described herein may be fabricated using sterile processes or may be sterilized after fabrication. Thus, the present invention contemplates kits that include a storage array that has fabricated implants and particles attached thereon. These storage array/ implant kits provide a convenient method for mass shipping and distribution of the manufactured implants.

In other embodiments, the implants and particles can be fabricated through the application of additive manufacturing techniques. Additive manufacturing, such as disclosed in U.S. Pat. No. 9,120,270, can be utilized to either make the master template used in the PRINT® process, to make the mold used in the PRINT® process disclosed herein or to fabricate the implants directly.

In a particular embodiment, the implants and particles are fabricated through the process of (i) dissolving polymers and a therapeutic agent in a solvent, for example acetone; (ii) casting the solution into a thin film; (iii) drying the film; (iv) folding the thin film onto itself; (v) heating the folded thin film on a substrate to form a substrate; (vi) positioning the thin film on the substrate onto a mold having mold cavities; (vii) applying pressure, and in some embodiments heat, to the mold-thin film-substrate combination such that the thin film enters the mold cavities; (viii) cooling; (ix) removing the substrate from the mold to provide implants that substantially mimic the size and shape of the mold cavities.

Delivery Devices

In embodiments, a delivery device may be used to insert an intravitreal implant or particle suspension of the present invention into the eye or eyes for treatment of an ocular disease or disorder. Suitable devices can include a needle or needle-like applicator, such as disclosed in published PCT application WO2018045386, which is hereby incorporated by reference herein in its entirety. In some embodiments, the smallest dimension of an implant may range from approximately 50 μm to approximately 750 μm, and therefore, a needle or needle-like applicator with a gauge ranging from approximately 15 to approximately 30 may be utilized. In certain embodiments, the need gauge is about 15, about 16, about 17, about 18, about 19, about 20, about 21, about 22, about 23, about 24, about 25, about 26, about 27, about 28, about 29, or about 30. In one embodiment, the device uses a 25-gauge needle for an implant with a smallest dimension of 265 μm. In another embodiment, the device uses a 21 or 22-gauge needle for an implant with a smallest dimension of 395 μm. In yet another embodiment, the device uses a 27-gauge needle for a particle suspension or for an implant with the smallest dimension of 200 μm. The delivery implant may be a syringe with an appropriately sized needle or may be a syringe-like implant with a needle-like applicator. In an embodiment, the device uses a 27-gauge ultra-thin wall needle having an inner diameter of 300+/−10 micrometers.

Delivery routes include punctual, intravitreal, subconjunctival, lens, intrascleral, fornix, anterior sub-Tenon's, suprachoroidal, posterior sub-Tenon's, subretinal, anterior chamber, and posterior chamber, among others.

In embodiments, an implant or implants are delivered to the anterior chamber of a patient's eye to treat glaucoma and/or elevated intraocular pressure.

In some embodiments, an implant or implants are delivered to the anterior chamber of a patient's eye to treat uveitis.

Kits

An intravitreal implant and a delivery device may be combined and presented as a kit for use. The implant may be packaged separately from the delivery device and loaded into the delivery device just prior to use. Alternatively, the implant may be loaded into the delivery implant prior to packaging. In this case, once the kit is opened, the delivery implant is ready for use. Components may be sterilized individually and combined into a kit or may be sterilized after being combined into a kit. Further, as aforementioned, a kit may include an array with implants bound thereon.

Use of an Intravitreal Implant of the Present Invention for Treatment of an Ocular Disease or Disorder In one aspect of the invention, there is presented a method of treating an ocular disease or disorder comprising placing an intravitreal implant of the present invention in an eye of a patient suffering from the ocular disease or disorder, degrading the implant, releasing a therapeutic agent in a substantially linear manner for a duration of at least about 3 months. The patient can be a human or an animal, e.g., a dog, cat, horse, cow (or any agricultural livestock).

Course of Treatment

Over the course of treatment, the biodegradable polymer matrix of a pharmaceutical composition of the present invention degrades releasing a therapeutic agent in a substantially linear manner for at least about 3 months. Once the therapeutic agent has been completely released, the polymer matrix is disintegrated. Complete polymer matrix degradation may take longer than the complete release of the therapeutic agent from the polymer matrix. Polymer matrix degradation may occur at the same rate as the release of the therapeutic agent.

Optionally, a pharmaceutical composition is dosed in a repetitive manner. The dosing regimen provides a second dose of a pharmaceutical composition of the present invention is dosed following the first dose's release of its therapeutic agent. This dosing regimen can be repeated 3, 4, 5, 6, 7, 8, 9, 10, or more times. In an embodiment an intravitreal implant of the present invention should be complete degraded before a re-dosing occurs.

The present invention may be better understood by reference to the following non-limiting examples, which are provided as exemplary of the invention. The following examples are presented in order to more fully illustrate the particular embodiments of the invention. They should in no way be construed, however, as limiting the broad scope of the invention.

EXAMPLES

Example 1: Implant Fabrication

A series of polymer matrix/therapeutic agent blends were prepared prior to fabrication of implants. Solvent mixing was used to produce homogenously dispersed therapeutic agent throughout the body of the implant. Each of the blends prepared contained a different ratio of PEA (polymer 1) to polymer 2, which contains PLA polymer, PLGA polymer, or a combination of PLA and PLGA polymers. The PLA polymer used to produce the pharmaceutical compositions was a RESOMER® R203S PLA polymer available from Evonik Industries. The PLGA polymer used to produce pharmaceutical compositions of the present invention for this example was a RESOMER® RG653H PLGA polymer, also available from Evonik Industries. The PEA used in the pharmaceutical compositions had the chemical structure III.

In producing the pharmaceutical compositions, the polymers were mixed together in a particular ratio, and then chloroform was directly added to allow the polymers to dissolve. The polymer/chloroform solution was then added directly to micronized dexamethasone. The chloroform was then evaporated on a polyethylene terephthalate (PET) sheet placed on a hot plate at 60° C. After the chloroform was removed, a thin film of homogenous material remained.

Example 2: Fabrication of Molds

A templated mold of desired dimensions a rod shape with a dimension of 265×265×4500 μm were fabricated utilizing the PRINT® process. The different pharmaceutical compositions of the invention produced are set forth in the $2^{nd}$ column of Table 1. If a polymer is not mentioned in the column 2 for a particular intravitreal implant of the invention, it means that polymer was not used in the production of the pharmaceutical composition used in that particular intravitreal implant.

Example 3: Dexamethasone Implant Fabrication

A series of implants were fabricated utilizing the polymer matrix/therapeutic agent blends of Example 1 and the molds of Example 2. Polymer matrix/therapeutic agent blend was spread over a PET sheet and was heated. Once heated, solvent dried completely. The blend was covered with the mold which had the desired dimensions. Light pressure was applied using a roller to spread the blend over the mold area. The mold/blend laminate was then passed through a commercially available thermal laminator using the parameters in the tables below. The blend flowed into the mold cavities and assumed the shape of the mold cavities. The blend was allowed to cool to room temperature and created individual implants in the mold cavities. The mold was then removed leaving a two-dimensional array of implants resting on the film. Individual implants were removed from the PET film utilizing forceps.

TABLE 1

Blend and Mold Designs

| Sample ID | RESOMER® polymer name (Ratio) | Polymer mass (mg) | DXM mass (mg) | Total mass (mg) | Target Polymer wt. % | Target DXM % loading | Mold Design |
|---|---|---|---|---|---|---|---|
| 1 | PEA/R203S (80/20) | 59 | 41 | 100 | 59 | 41 | 265 × 260 × 4500 μm |
| 2 | PEA/R203S (70/30) | 59 | 41 | 100 | 59 | 41 | 265 × 260 × 4500 μm |
| 3 | PEA/R203S/ RG653H (60/24/16) | 59 | 41 | 100 | 59 | 41 | 265 × 260 × 4500 μm |
| 4 | PEA/R203S/ RG653H (60/32/8) | 59 | 41 | 100 | 59 | 41 | 265 × 260 × 4500 μm |
| 5 | PEA/R203S/ RG653H (50/40/10) | 59 | 41 | 100 | 59 | 41 | 265 × 260 × 4500 μm |

TABLE 1-continued

Blend and Mold Designs

| Sample ID | RESOMER® polymer name (Ratio) | Polymer mass (mg) | DXM mass (mg) | Total mass (mg) | Target Polymer wt. % | Target DXM % loading | Mold Design |
|---|---|---|---|---|---|---|---|
| 6 | PEA/R202S/RG653H (50/40/10) | 59 | 41 | 100 | 59 | 41 | 265 × 260 × 4500 μm |
| 7 | PEA/RG503S/RG503H (60/20/20) | 59 | 41 | 100 | 59 | 41 | 265 × 260 × 4500 μm |
| 8 | PEA/RG503S/RG503H (60/30/10) | 93.7 | 76.6 | 170.30 | 55 | 45 | 265 × 260 × 4500 μm |
| 9 | PEA/RG503S/RG503H (60/10/30) | 91.70 | 75 | 166.70 | 55 | 45 | 265 × 260 × 4500 μm |
| 10 | PEA/RG503S/RG503H (40/30/30) | 90.5 | 74 | 164.50 | 55 | 45 | 265 × 260 × 4500 μm |
| 11 | PEA/RG502S/RG502H (40/30/30) | 96.50 | 79 | 175.50 | 55 | 45 | 265 × 260 × 4500 μm |
| 12 | PEA/RG502S/RG503H (40/30/30) | 93.40 | 76.6 | 170 | 55 | 45 | 265 × 260 × 4500 μm |
| 13 | PEA/RG502S/RG503H (60/20/20) | 95.74 | 78.1 | 173.84 | 55 | 45 | 265 × 260 × 4500 μm |
| 14 | PEA/RG503S/RG502H (50/25/25) | 108.77 | 88.8 | 197.57 | 55 | 45 | 265 × 260 × 4500 μm |
| 15 | PEA/RG503S/RG503H (60/20/20) | 92.37 | 167.87 | 300 | 55 | 45 | 265 × 260 × 4500 μm |

Example 4: Analysis of Dexamethasone Content

Implants produced as described above were dissolved in acetonitrile, methanol & water. Dexamethasone content of each implant was measured by RP-HPLC using a Phenomenex Luna® Phenyl-Hexyl HPLC 3 μm particle size, 4.6× 100 mm analytical column. The mobile phase consisted of a gradient of 0.1% trifluoroacetic acid (TFA) in purified water and acetonitrile over 4 minutes at 1.0 mL/min. UV absorbance of the dexamethasone was measured at 245 nm. Table 2 sets for the dexamethasone content measured in each implant.

TABLE 2

Dexamethasone Content

| Sample ID | Total Mass Dexamethasone (μg) |
|---|---|
| 1 | 113 |
| 2 | 110 |
| 3 | 113 |
| 4 | 121 |
| 5 | 137 |
| 6 | 132 |
| 7 | 102 |
| 8 | 180 |
| 9 | 160 |
| 10 | 147 |
| 11 | 194 |
| 12 | 170 |
| 13 | 139 |
| 14 | 163 |
| 15 | 148 |

Example 5: In-Vitro Release Analysis of Select Implants

Figure 2:
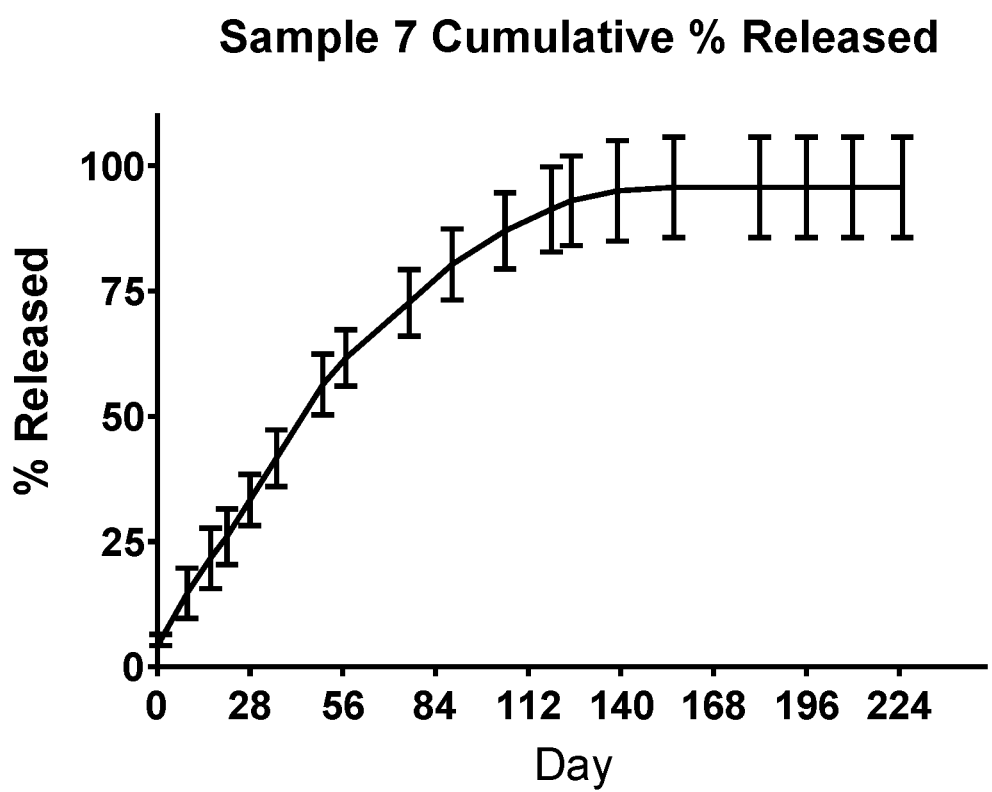
FIG. 2 is a graph of the cumulative percentage of dexamethasone released from intravitreal implant 7.

Single implants described above were placed into a 4 mL glass screw top vial and were incubated at 37° C. in 3 mL of 1×PBS. At each time point of interest, the media was removed for analysis. The media was then replaced with 3 mL of fresh media. The media that was removed was analyzed for dexamethasone released via the HPLC method. FIG. 1 sets forth the in vitro release of dexamethasone measured per implant evaluated. FIG. 2 sets forth the cumulative % of dexamethasone released from implant sample 7. The graph shows that from day 0 to approximately day 90 the, slope of the graph was substantially constant. Thus, these data demonstrate that a pharmaceutical composition (for example, an intravitreal implant) of the present invention releases a therapeutic agent in a substantially linear manner for at least 3 months.

Sample 7 is a intravitreal implant of the present invention made from a pharmaceutical composition of the present invention that comprises: (a) about 59 weight % a polymer matrix that comprises (i) about 60 weight % biodegradable polyester amide homopolymer having a chemical structural formula (III), (ii) about 20 weight % biodegradable poly(D,L-lactide) homopolymer; and about (iii) 20 weight % biodegradable poly (D,L-lactide-co-glycolide) copolymer, wherein (i), (ii) and (iii) are blended together to form the polymer matrix, and (b) about 41 weight % dexamethasone homogenously dispersed within the polymer matrix.

Figure 3:
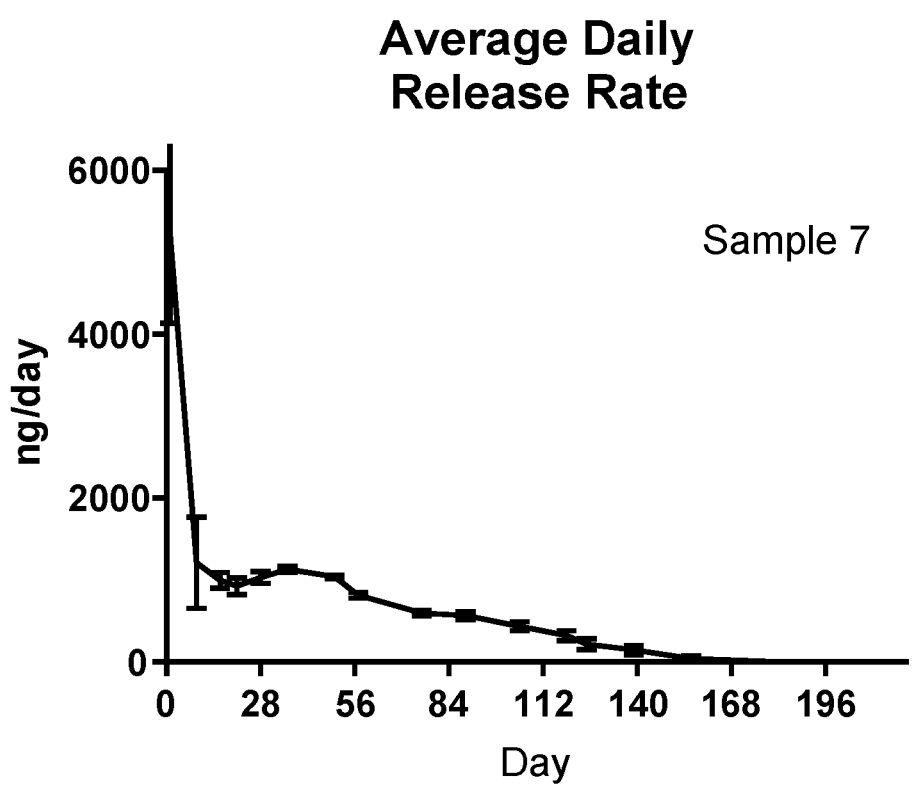
FIG. 3 is a graph of the average daily release rate of dexamethasone from intravitreal implant 7.

FIG. 3 is a graph of the average daily release rate of dexamethasone from intravitreal implant sample 7 of the present invention. In FIG. 3, the amount of daily release of dexamethasone from day 0 to approximately day 90 is substantially constant, which also demonstrates that a pharmaceutical composition (for example, an intravitreal implant) of the present invention releases a therapeutic agent in a substantially linear manner for at least 3 months.

PEA-only polymer matrices exhibit very slow and non-linear release profiles. PLGA/PLA-only polymer matrices exhibit initial burst followed by nonlinear release profiles.

It was surprisingly observed that dexamethasone eluting from combination PEA/PLGA matrices exhibited high daily amount of release and substantially linear release profiles (e.g., for up to 90 days from initial administration).

The present invention is not to be limited in scope by the specific embodiments describe herein. Various modifications of the invention in addition to those described herein will become apparent to those skilled in the art from the foregoing description and the accompanying figures. Such modifications are intended to fall within the scope of the appended claims.

Example 6: Compound and Composition Storage and Stability

A compound or composition provided herein is prepared and placed in a container for storage at ambient or elevated temperature. When the compound or composition is stored in a polyolefin plastic container as compared to a polyvinyl chloride plastic container, discoloration of the compound or composition is reduced, whether dissolved or suspended in a liquid composition (e.g., an aqueous or organic liquid solution), or as a solid. Without wishing to be bound by theory, the container reduces exposure of the container's contents to electromagnetic radiation, whether visible light (e.g., having a wavelength of about 380-780 nm) or ultraviolet (UV) light (e.g., having a wavelength of about 190-320 nm (UV-B light) or about 320-380 nm (UV-A light)). Some containers also include the capacity to reduce exposure of the container's contents to infrared light, or a second component with such a capacity. The containers used include those made from a polyolefin such as polyethylene, polypropylene, polyethylene terephthalate, polycarbonate, polymethylpentene, polybutene, or a combination thereof, especially polyethylene, polypropylene, or a combination thereof. The container may further be disposed within a second container, for example, a paper, cardboard, paperboard, metallic film, or foil, or a combination thereof, container to further reduce exposure of the container's contents to UV, visible, or infrared light. Compounds and compositions benefiting from reduced discoloration, decomposition, or both during storage, include eye drop solutions or implants that include a compound or composition thereof provided herein. Eye drop solutions or implants may need storage lasting up to, or longer than, three months; in some cases up to, or longer than one year. The containers described herein may be eye drop or implant containers. The containers may be in any form suitable to contain the contents; for example, a bag, a bottle, or a box.

Other suitable containers and packaging are described, for example, in International publication numbers WO 2018/159700, WO 2018/159701, and WO 2018/159702, and JP 6236167 B2, the contents of which are incorporated herein by reference.

Compositions disposed within the containers described may include: boric acid, D-mannitol, benzalkonium chloride, polyoxyl 40 stearate, polyethylene glycol 400, ethylenediamine tetraacetic acid, or a combination thereof; and water or another suitable solvent vehicle or excipient. In some cases, the vehicle is an aqueous vehicle. In other cases, the vehicle is a non-aqueous vehicle.

Example 7: Polymer Matrix/Therapeutic Agent Blending

A series of polymer matrix/therapeutic agent blends were prepared prior to fabrication of implants. Hot melt mixing was used to produce homogenously dispersed therapeutic agent throughout the body of the implant. Polymer and small molecule JAK inhibitor were cryomilled to make fine powder. The powder was hot melt mixed by using a hotplate at 130° C. to give a homogeneous paste.

Example 8: Fabrication of Molds

A templated mold having dimensions of a rod shape with a dimension of 200×200×4500 µm was fabricated utilizing the PRINT® process. An implant was fabricated with JAK inhibitor (1R,2R)—N-(4-methylisoquinolin-6-yl)-2-(4-(N-(pyridin-2-yl)sulfamoyl)phenyl)cyclopropane-1-carboxamide.

Example 9: Implant Fabrication

A series of implants were fabricated utilizing the polymer matrix and JAK inhibitor blends of Example 7 and the mold of Example 8 (see Table 3). Polymer matrix/therapeutic agent blend was spread over a PET sheet and was heated. Once heated, the blend was covered with the mold, which had the desired dimensions. Light pressure was applied using a roller to spread the blend over the mold area. The mold/blend laminate was then passed through a commercially available thermal laminator using the parameters in Table 4 below. The blend flowed into the mold cavities and assumed the shape of the mold cavities. The blend was allowed to cool to room temperature and created individual implants in the mold cavities. The mold was then removed leaving a two-dimensional array of implants resting on the film. Individual implants were removed from the PET film utilizing forceps.

TABLE 3

Blend compositions and mold designs

| Sample ID | RESOMER® polymer name (Ratio) | Polymer mass (mg) | JAK Inhibitor | Total mass (mg) | Target Polymer wt. % | Target DXM % loading | Mold Design |
| --- | --- | --- | --- | --- | --- | --- | --- |
| 16 | PEA/RG502/RG502H (60/20/20) | 180 | 120 | 100 | 60 | 40 | 200 × 200 × 4500 µm |
| 17 | PEA/RG502/RG502H (50/20/30) | 107 | 88 | 100 | 55 | 45 | 200 × 200 × 4500 µm |

TABLE 4

| Process Parameters | | | |
|---|---|---|---|
| Process Temp (° C.) (touch probe) | Process Temp (° C.) (IR TM) | Nip speed inch/min | Nip Pressure (psi) |
| 151 | 168 | 0.7 | 80 |
| 151 | 167 | 0.7 | 80 |

To analyze the implant content, the implant was first dissolved in 1 mL DMSO. Once dissolved, 3 mL of methanol was added to each sample and mixed. Small molecule JAK inhibitor content was measured by RP-HPLC using a Waters Atlantis T3, 3 µm particle size, 4.6×75 mm analytical column. The mobile phase consisted of a gradient of 0.1% TFA in purified water and acetonitrile over 5 minutes at 1.0 mL/min. UV absorbance of the therapeutic agent was measured at 262 nm.

Figure 4:
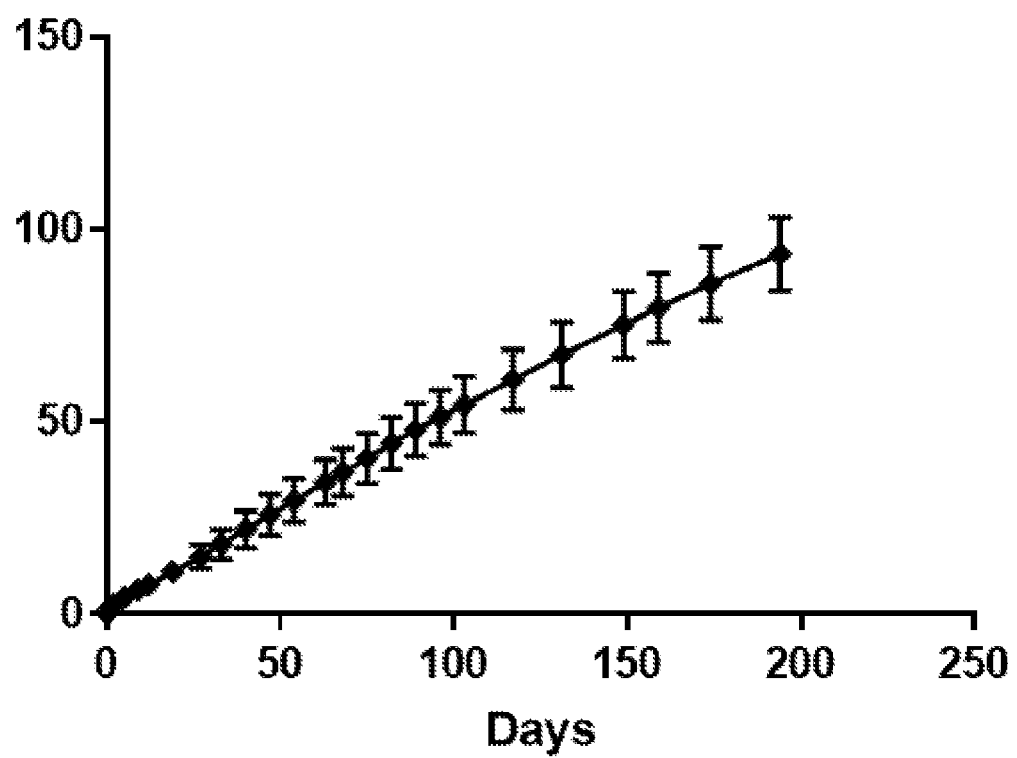
FIG. 4 is a graph of the cumulative percentage of therapeutic agent released over time from sample 16.
Figure 5:
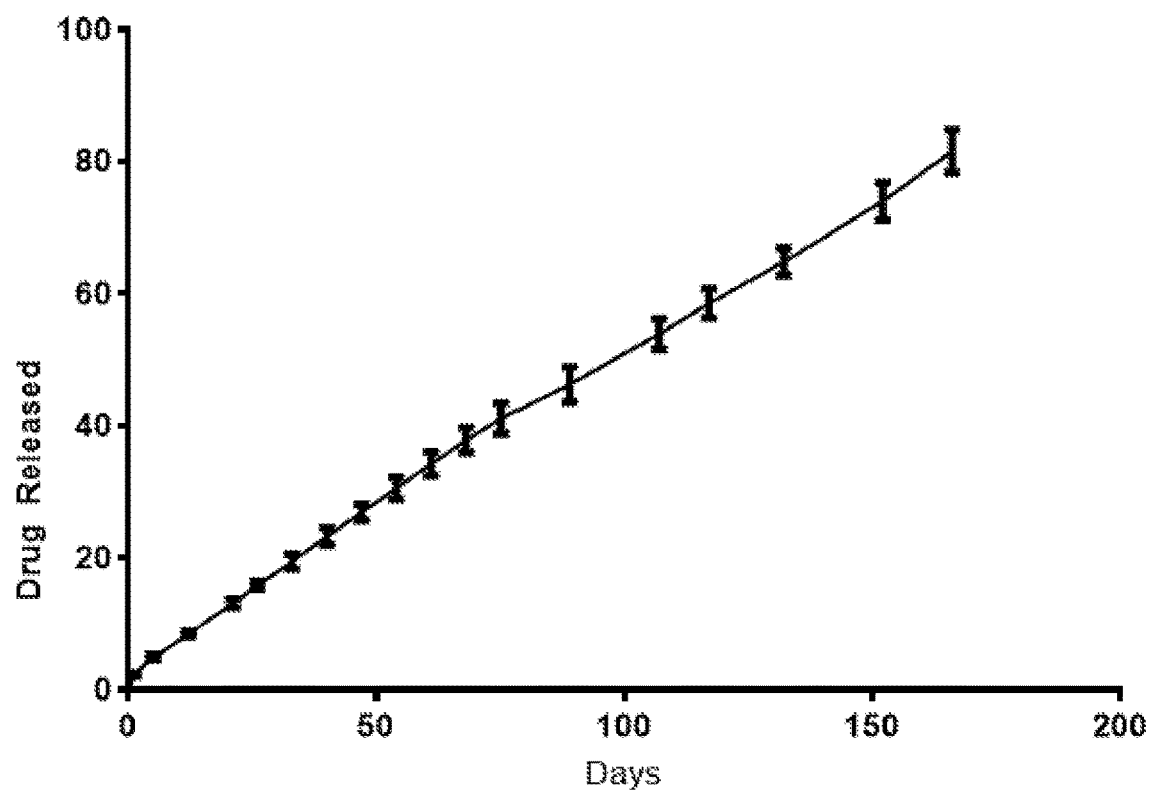
FIG. 5 is a graph of the cumulative percentage of therapeutic agent released over time from sample 17.

The in-vitro release of implant formulation was analyzed. Single implants were placed into a 4 mL glass screw top vial and were incubated at 37° C. in 3 mL of 1×PBS with 0.5% Tween 20. At each time point of interest, the media was removed for analysis. The media was then replaced with 3 mL of fresh media. The media that was removed was analyzed via the HPLC method for the released therapeutic agent (i.e. (1R,2R)—N-(4-methylisoquinolin-6-yl)-2-(4-(N-(pyridin-2-yl)sulfamoyl)phenyl)cyclopropane-1-carboxamide). As can be seen in FIG. 4 and FIG. 5, at least the first 80% of the therapeutic agent released from the implants had an $R^2$ value of 0.9 or greater.

What is claimed is:

1. A pharmaceutical composition for treating an ocular disease or disorder, comprising:
   (a) a biodegradable polymer matrix consisting of a mixture of a first polymer and a second polymer, wherein:
      (1) the first polymer is a biodegradable polyester amide polymer, wherein the biodegradable polyester amide polymer comprises structure (II):

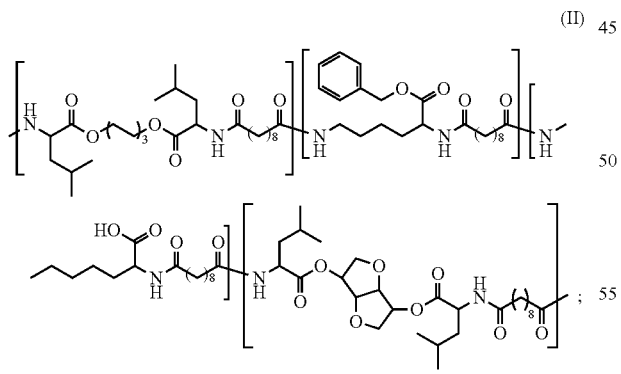

(II)

and
      (2) the second polymer is a combination of an ester end-capped biodegradable poly (D,L-lactide-co-glycolide) copolymer and an acid end-capped biodegradable poly (D,L-lactide-co-glycolide) copolymer; and
   (b) at least one therapeutic agent, pharmaceutically acceptable salt, zwitterion, polymorph, or solvate thereof, wherein the at least one therapeutic agent is selected from gefitinib, lapatinib, erlotinib, sunitinib, sorafenib, regorafenib, afatinib, vandetanib, semaxanib, cediranib, neratinib, axitinib, lestaurtinib, tivozanib, dexamethasone, or (1R,2R)—N-(4-methylisoquinolin-6-yl)-2-(4-(N-(pyridin-2-yl)sulfamoyl)phenyl)cyclopropane-1-carboxamide;
   wherein the at least one therapeutic agent, pharmaceutically acceptable salt, zwitterion, polymorph, or solvate thereof is homogenously dispersed within the biodegradable polymer matrix;
   wherein the pharmaceutical composition is formulated for intravitreal administration to a subject's eye, and the pharmaceutical composition is formulated to release the at least one therapeutic agent from the pharmaceutical composition in a substantially linear manner for at least 6 months;
   wherein the biodegradable polymer matrix is about 59 weight % of the pharmaceutical composition, and the at least one therapeutic agent, pharmaceutically acceptable salt, zwitterion, polymorph, or solvate thereof is about 41 weight % of the pharmaceutical composition; and
   wherein the first polymer is about 60 weight % of the biodegradable polymer matrix and the second polymer is about 40 weight % of the biodegradable polymer matrix.

2. A pharmaceutical composition as in claim 1, wherein the at least one therapeutic agent is selected from:
   gefitinib;
   lapatinib;
   erlotinib;
   sunitinib;
   sorafenib;
   regorafenib;
   afatinib;
   vandetanib;
   semaxanib;
   cediranib;
   neratinib;
   axitinib;
   lestaurtinib;
   tivozanib; or
   a combination thereof.

3. A pharmaceutical composition as in claim 1, wherein the biodegradable polymer matrix is a mechanical blend of the first polymer and the second polymer.

4. A pharmaceutical composition as in claim 1, wherein: the ester end-capped biodegradable poly (D,L-lactide-co-glycolide) copolymer is about 20 weight % of the biodegradable polymer matrix, and the acid end-capped biodegradable poly (D,L-lactide-co-glycolide) copolymer is about 20 weight % of the biodegradable polymer matrix.

5. A pharmaceutical composition as in claim 1, wherein the pharmaceutical composition is a particle comprising dimensions of about 200×200×4500 µm.

* * * * *